(12) United States Patent
Nakaseko

(10) Patent No.: US 8,184,172 B2
(45) Date of Patent: May 22, 2012

(54) SOLID-STATE IMAGING DEVICE AND DRIVING CONTROL METHOD

(75) Inventor: Tetsuji Nakaseko, Fukuoka (JP)

(73) Assignee: Sony Corporation (JP)

( * ) Notice: Subject to any disclaimer, the term of this patent is extended or adjusted under 35 U.S.C. 154(b) by 204 days.

(21) Appl. No.: 12/655,667

(22) Filed: Jan. 5, 2010

(65) Prior Publication Data

US 2010/0171873 A1    Jul. 8, 2010

(30) Foreign Application Priority Data

Jan. 7, 2009 (JP) ................. P2009-001513
Apr. 20, 2009 (JP) ................. P2009-101636

(51) Int. Cl.
*H04N 5/225* (2006.01)
*H04N 5/235* (2006.01)

(52) U.S. Cl. .............. 348/220.1; 348/221.1; 348/229.1

(58) Field of Classification Search .......... 348/220.1, 348/221.1, 229.1, 296
See application file for complete search history.

(56) References Cited

U.S. PATENT DOCUMENTS

| | | |
|---|---|---|
| 2001/0005225 A1 | 6/2001 | Clark et al. |
| 2008/0158402 A1 | 7/2008 | Okano et al. |
| 2008/0180547 A1* | 7/2008 | Hirose ................. 348/229.1 |
| 2008/0284876 A1* | 11/2008 | Makino ................. 348/231.99 |
| 2009/0147120 A1* | 6/2009 | Kurane ................. 348/311 |
| 2009/0160947 A1* | 6/2009 | Shigeta et al. ........... 348/207.99 |

FOREIGN PATENT DOCUMENTS

| | | |
|---|---|---|
| JP | 62281574 A | 12/1987 |
| JP | 2000308075 A | 11/2000 |
| JP | 2001511628 T | 8/2001 |
| JP | 2003046876 A | 2/2003 |
| JP | 2008028608 A | 2/2008 |
| JP | 2008-167003 A | 7/2008 |

OTHER PUBLICATIONS

Office Action from Japanese Application No. 2009-101636, dated Jun. 7, 2011.
Office Action from Japanese Application No. 2009-101636, dated Nov. 2, 2010.

* cited by examiner

*Primary Examiner* — James Hannett
(74) *Attorney, Agent, or Firm* — Lerner, David, Littenberg, Krumholz & Mentlik, LLP

(57) ABSTRACT

A solid-state imaging device includes: a pixel array section formed by a plurality of pixels including a photoelectric conversion element disposed in the form of a matrix; and control means for selectively controlling shutter operations and readout operations performed on the pixels of the pixel array section on a row-by-row basis to control an exposure time for the pixels, wherein the control means provides an exposure time lasting for Q frame periods to expose the pixels in each row of the pixel array section when sub-sampling reading is performed at a sub-sampling ratio of 1/Q (Q is a positive integer).

6 Claims, 17 Drawing Sheets

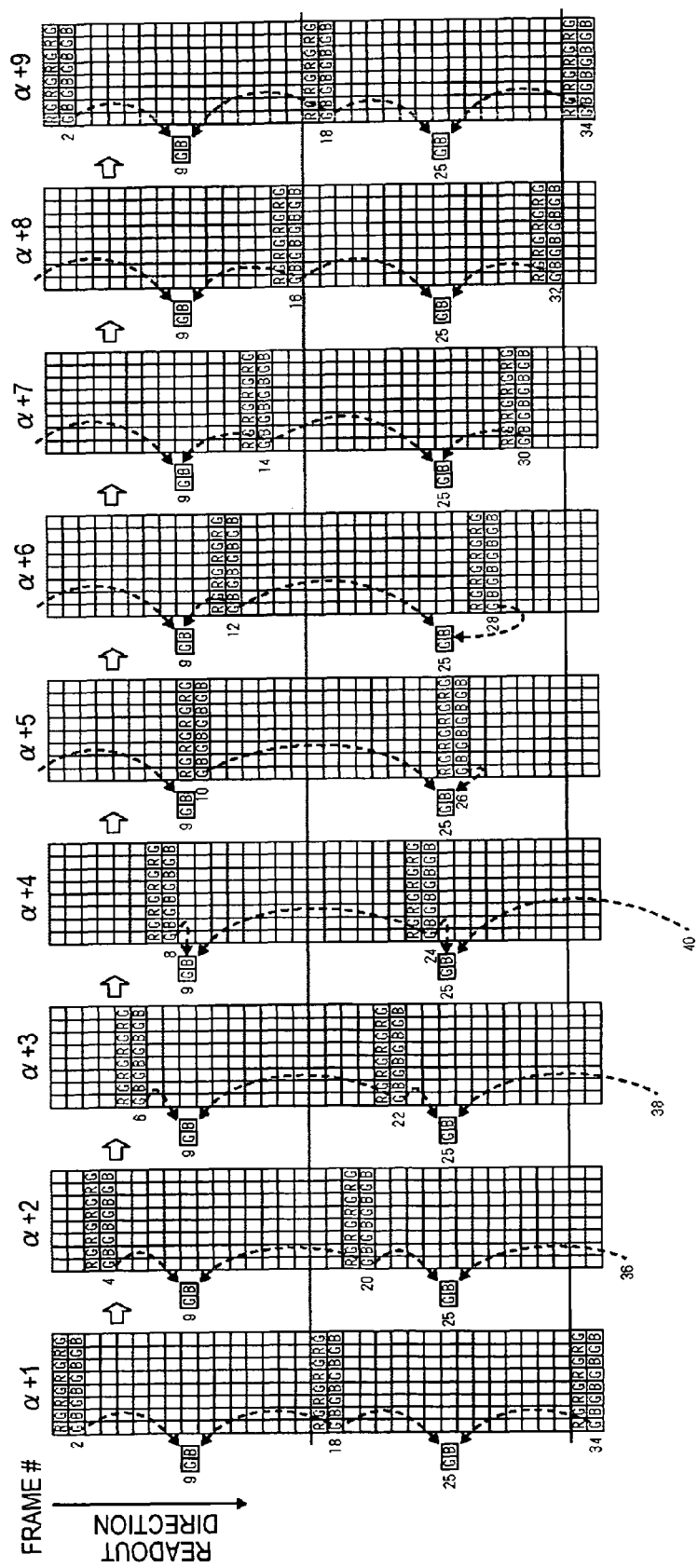

SOLID-STATE IMAGING DEVICE AND DRIVING CONTROL METHOD

CROSS-REFERENCE TO RELATED APPLICATION

The present application claims priority from Japanese Patent Application Nos. JP 2009-001513 and JP 2009-101636 filed in the Japanese Patent Office on Jan. 7, 2009 and Apr. 20, 2009, respectively, the entire contents of which are incorporated herein by reference.

BACKGROUND OF THE INVENTION

1. Field of the Invention

The present invention relates to a solid-state imaging device and a driving control method and, more particularly, to a solid-state imaging device and a driving control method which allow imaging to be performed at a high speed using sub-sampling reading while preventing any reduction in the sensitivity of pixels.

2. Description of the Related Art

There is an accelerating trend toward CMOS (Complementary Metal Oxide Semiconductor) image sensors having a greater number of pixels. It takes a longer time for a CMOS image sensor to acquire one screen (one image) and it is therefore difficult to perform imaging at a high speed, the greater the number of pixels of the image sensor.

Approaches adopted to perform high speed imaging without changing resolution (without a reduction in resolution) include the use of signal processing such as an addition process. However, the signal processing must be adapted to a high frame rate, and a signal processing circuit for such a purpose is expensive. Further, the approach results in a cost increase because it necessities an additional memory.

Under the circumstance, sub-sampling reading is widely used as a method of performing high speed imaging at a low cost by taking advantage of the fact that CMOS image sensors have random accessibility to each pixel (for example, see JP-A-2008-167003 (Patent Document 1)).

Sub-sampling reading is a method of imaging in which a plurality pixels disposed in the form of a matrix are read out such that some of the pixels at predetermined intervals are skipped (sub-sampled) and in which one screen is formed by the pixels read out by surviving the sub-sampling. Since the number of pixels read out is reduced, an improved frame rate can be achieved although resolution is degraded.

SUMMARY OF THE INVENTION

However, when high speed imaging is performed at a high frame rate at the sacrifice of resolution by sub-sampling pixels to be read, since the time for exposure of each pixel is shortened, the problem arises in that the sensitivity of pixels (the quantity of light received at the pixels) is reduced.

Under the circumstances, it is desirable to prevent the sensitivity of pixels from being reduced when imaging is performed at a high speed using sub-sampling reading.

According to an embodiment of the invention, there is provided a solid-state imaging device which includes a pixel array section formed by a plurality of pixels including a photoelectric conversion element disposed in the form of a matrix and control means for selectively controlling shutter operations and readout operations performed on the pixels of the pixel array section on a row-by-row basis to control an exposure time for the pixels. The control means provides an exposure time lasting for Q frame periods to expose the pixels in each row of the pixel array section when sub-sampling reading is performed at a sub-sampling ratio of 1/Q (Q is a positive integer).

In a p-th frame following a (p−1)-th frame (P>1), the control means may cause shutter operations and readout operations to be performed on rows of the pixel array section excluding rows on which shutter operations and readout operations have been performed in the (p−1)-th frame.

The control means may cause shutter operations and readout operations to be performed on all rows of the pixel array section in Q frame periods.

The pixel data of the pixels read out by the readout operation may be output at a predetermined outputting row.

The device may further include signal processing means for calculating and outputting weighted sums of the pixel data of the two readout rows closest to the outputting row in the vertical direction of the pixel array section.

The solid-state imaging device may be a column A/D conversion type.

According to another embodiment of the invention, there is provided a driving control method for a solid-state imaging device having a pixel array section formed by a plurality of pixels including a photoelectric conversion element disposed in the form of a matrix and control means for selectively controlling shutter operations and readout operations performed on the pixels of the pixel array section on a row-by-row basis to control an exposure time for the pixels. The method includes the step of selectively controlling shutter operations and readout operations performed on the pixels in the pixel array section on a row-by-row basis such that an exposure time lasting for Q frame periods is provided to expose the pixels in each row of the pixel array section when sub-sampling reading is performed at a sub-sampling ratio of 1/Q.

In the embodiments of the invention, shutter operations and readout operations performed on the pixels of the pixel array section are selectively controlled on a row-by-row basis such that an exposure time lasting for Q frame periods is provided to expose the pixels in each row of the pixel array section when sub-sampling reading is performed at a sub-sampling ratio of 1/Q.

The solid-state imaging device may be an independent device, and it may alternatively be an internal device forming a part of an imaging apparatus.

According to the embodiments of the invention, any reduction in the sensitivity of pixels can be prevented when imaging is performed at a high speed using sub-sampling reading.

BRIEF DESCRIPTION OF THE DRAWINGS

FIG. 18 is an illustration showing a correction process performed when the outputting rows are GR rows.

DESCRIPTION OF THE PREFERRED EMBODIMENTS

CMOS Image Sensor Block Diagram

Figure 1:
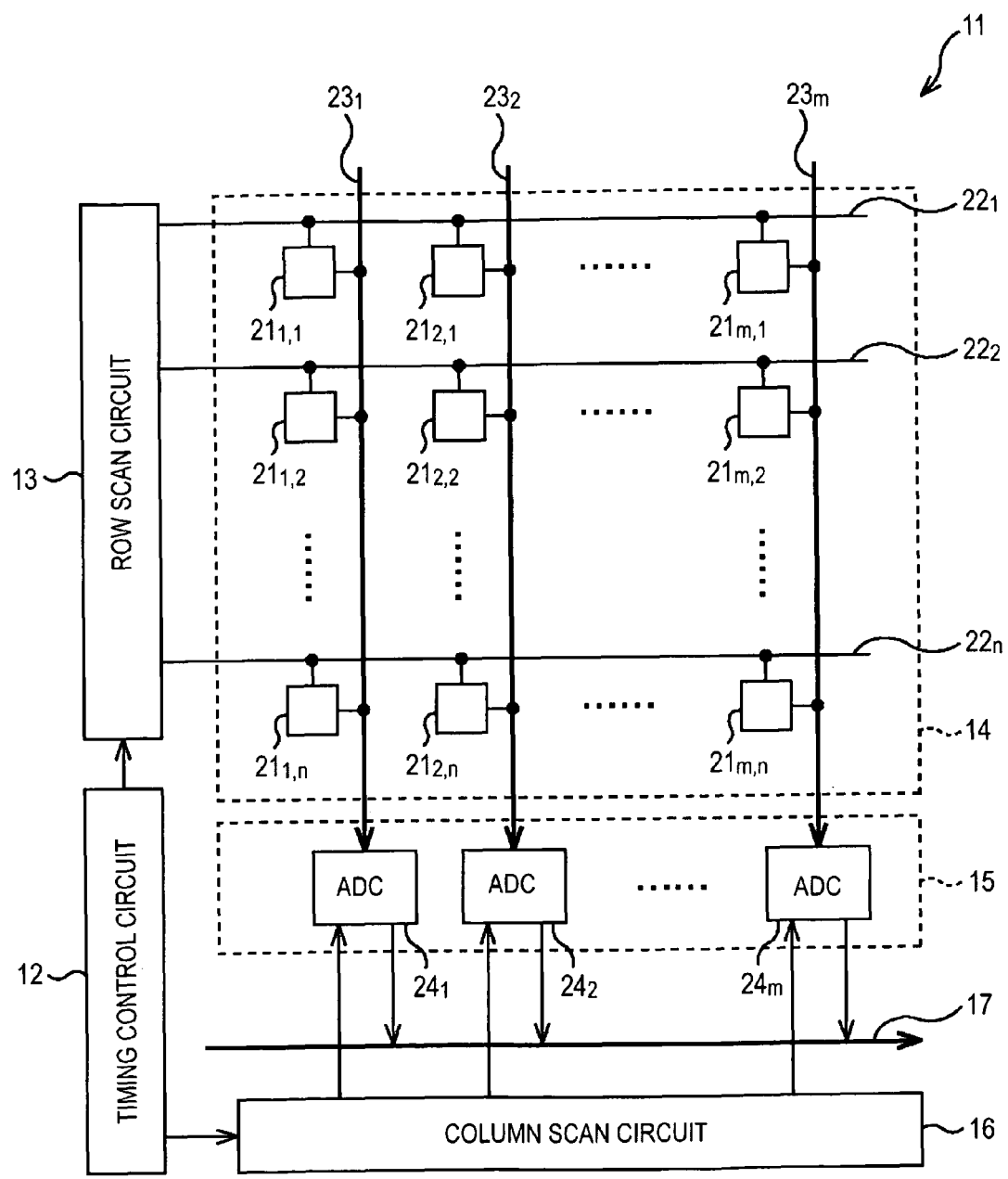
FIG. 1 is a diagram showing an exemplary configuration of an embodiment of a CMOS image sensor according to an embodiment of the invention.

FIG. 1 shows an exemplary configuration of an embodiment of a CMOS image sensor (solid-state imaging device) according to an embodiment of the invention.

A CMOS image sensor 11 shown in FIG. 1 includes a timing control circuit 12, a row scan circuit 13, a pixel array section 14, a column processing section 15, a column scan circuit 16, and a horizontal output line 17.

The timing control circuit 12 supplies clock signals and timing signals required for predetermined operations to the row scan circuit 13 and the column scan circuit 16 based on a master clock having a predetermined frequency. For example, the timing control circuit 12 supplies timing signals for controlling a shutter operation and a read-out operation performed at pixels to the row scan circuit 13 and the column scan circuit 16.

The row (vertical) scan circuit 13 sequentially supplies signals for controlling the output of pixel signals to rows of pixels arranged in the vertical direction of the pixel array section 14 at predetermined timing.

The pixel array section 14 includes pixels 21 disposed in the form of a matrix having n rows and m columns, i.e., pixels $21_{1,1}$ to $21_{m,n}$, horizontal signal lines $22_1$ to $22_n$, and m vertical signal lines $23_1$ to $23_m$.

Although not shown, each of the pixels $21_{1,1}$ to $21_{m,n}$ includes a photoelectric conversion element (e.g., a photodiode), a transfer transistor, a reset transistor, and an amplifier transistor. The transfer transistor transfers an electrical charge obtained by the photoelectric conversion element to an FD (floating diffusion) section. The reset transistor resets an electrical potential at the FD section. The amplifier transistor outputs a pixel signal according to the electrical potential at the FD section. Operations of the transistors are controlled by signals supplied from the row scan circuit 13 through the horizontal signal lines $22_1$ to $22_n$. Instead of the above-described configuration employing three transistors, each pixel 21 may be configured using four transistors including a selection transistor provided for selecting the pixel.

The pixels $21_{1,1}$ to $21_{m,n}$ output pixel signals in accordance with electrical charges accumulated at the photoelectric conversion elements to the respective vertical signal lines $23_1$ to $23_m$ according to signals supplied from the row scan circuit 13 through the respective horizontal signal lines $22_1$ to $22_n$.

The horizontal signal lines $22_1$ to $22_n$ connect respective horizontal rows of the pixels 21 or pixels $21_{1,1}$ to $21_{m,n}$ to the row scan circuit 13. Specifically, the pixels $21_{1,1}$ to $21_{m,1}$ are connected to the horizontal signal line $22_1$, and the pixels $21_{1,2}$ to $21_{m,2}$ are connected to the horizontal signal line $22_2$. The description similarly applies up to the horizontal signal line $22_n$ to which the pixels $21_{1,n}$ to $21_{m,n}$ are connected.

The vertical signal lines $23_1$ to $23_m$ connect respective vertical rows of the pixels 21 or pixels $21_{1,1}$ to $21_{m,n}$ to the column processing section 15. Specifically, the pixels $21_{1,1}$ to $21_{1,n}$ are connected to the vertical signal line $23_1$, and the pixels $21_{2,1}$ to $21_{2,n}$ are connected to the vertical signal line $23_2$. The description similarly applies up to the vertical signal line $23_m$ to which the pixels $21_{m,1}$ to $21_{m,n}$ are connected.

Therefore, the pixels $21_{1,1}$ to $21_{1,n}$ output pixel signals to the vertical signal line $23_1$ according to electrical charges accumulated at their photoelectric conversion elements. The pixels $21_{2,1}$ to $21_{2,n}$ output pixel signals to the vertical signal line $23_2$ according to electrical charges accumulated at their photoelectric conversion elements. The description similarly applies up to the pixels $21_{m,1}$ to $21_{m,n}$ which output pixel signals to the vertical signal line $23_m$ according to electrical charges accumulated at their photoelectric conversion elements.

The column processing section 15 includes m ADCs (Analog-Digital Converters) $24_1$ to $24_m$ disposed in parallel. The ADCs $24_1$ to $24_m$ are connected to the vertical signal lines $23_1$ to $23_m$, respectively.

The ADCs $24_1$ to $24_m$ perform a CDS (Correlated Double Sampling) process and an A/D conversion process on pixel signals supplied from the pixels $21_{1,1}$ to $21_{m,n}$ through the vertical signal lines $23_1$ to $23_m$.

Specifically, the vertical signal line $23_1$ is connected to the ADC $24_1$, and the ADC $24_1$ performs a CDS process and an A/D conversion process on pixel signals supplied from the pixels $21_{1,1}$ to $21_{1,n}$ through the vertical signal line $23_1$. The vertical signal line $23_2$ is connected to the ADC $24_2$, and the ADC $24_2$ performs a CDS process and an A/D conversion process on pixel signals supplied from the pixels $21_{2,1}$ to $21_{2,n}$ through the vertical signal line $23_2$. The description similarly applies up to the ADC $24_m$ which performs a CDS process and an A/D conversion process on pixel signals supplied from the pixels $21_{m,1}$ to $21_{m,n}$ through the vertical signal line $23_m$.

Each of the ADCs $24_1$ to $24_m$ temporarily stores A/D converted pixel data and outputs the data to the horizontal output line 17 under control exercised by the column scan circuit 16.

The column (horizontal) scan circuit 16 causes the pixel data stored in the ADCs $24_1$ to $24_m$ to be sequentially output to the horizontal output line 17 at predetermined timing.

The horizontal output line 17 is connected to a DSP (Digital Signal Processor) and the like which are provided downstream of the same for image processing, and outputs to the downstream the pixel data output from the ADCS $24_1$ to $24_m$.

The CMOS image sensor 11 having the above-described configuration is a so-called column A/D type CMOS image sensor in which an ADC is provided for each column of pixels.

A color filter for any of red (R), green (G), or blue (B) is provided at each of the pixels $21_{1,1}$ to $21_{1,n}$ of the CMOS image sensor 11 shown in FIG. 1, and red, green, or blue light is received at each of the pixels 21.

[Pixel Arrangement and Configuration]

Figure 2:
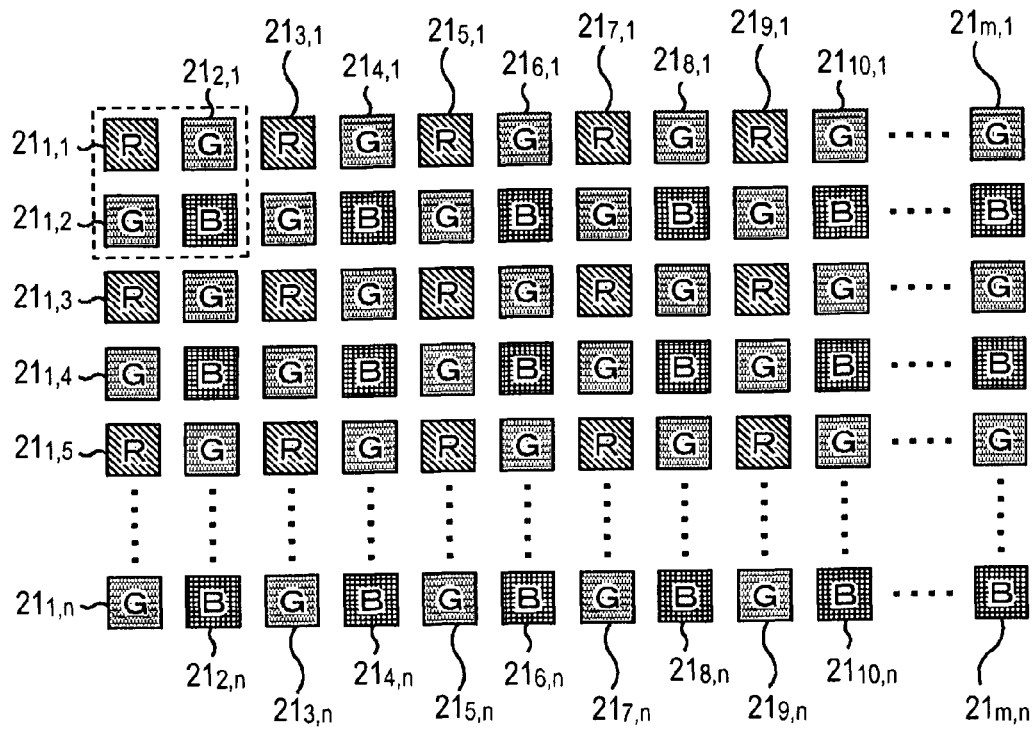
FIG. 2 is an illustration showing an example of arrangement of R, G, and B color filters in the CMOS image sensor.

FIG. 2 shows an exemplary arrangement of the R, G, and B color filters of the CMOS image sensor 11.

The RGB arrangement shown in FIG. 2 is what is called Bayer arrangement. The Bayer arrangement is an arrangement in which color arrays each including one red filter, two green filters, and one blue filter are repeatedly disposed in a row direction and a column direction.

For example, the pixels $21_{1,1}$, $21_{2,1}$, $21_{1,2}$, and $21_{2,2}$ act as one set as represented by a dotted line in FIG. 2, and the pixel $21_{1,1}$ among the set of pixels is a pixel which receives red light. The pixel $21_{2,1}$ adjoining the pixel $21_{1,1}$ in the row direction and the pixel $21_{1,2}$ adjoining the pixel $21_{1,1}$ are pixels which receive green light, and the pixel $21_{2,2}$ is a pixel which receives blue light. Color arrays which are the same as the set of pixels including the pixels $21_{1,1}$, $21_{2,1}$, $21_{1,2}$, and $21_{2,2}$ are repeatedly disposed in the row direction and the column direction.

Although it has been described above that the CMOS image sensor 11 of the present embodiment employs the Bayer color arrangement, the invention is not limited to such an arrangement.

The CMOS image sensor 11 having the above-described configuration is capable of imaging based on all-pixel readout according to which all of the pixels $21_{1,1}$ to $21_{m,n}$ of the pixel array section 14 are sequentially read out. The sensor is also capable of imaging based on sub-sampling reading, i.e., a readout method in which the pixels 21 are read out with some of the pixels skipped at predetermined intervals.

All-pixel readout is a method according to which electrical charges accumulated in the photoelectric conversion elements at all of the pixels $21_{1,1}$ to $21_{m,n}$ of the pixel array section 14 are sequentially read out in a predetermined order, e.g., raster scan order. All-pixel readout allows imaging to be performed at a high resolution utilizing all of the pixels $21_{1,1}$, to $21_{m,n}$ of the pixel array section 14.

According to sub-sampling reading, since predetermined pixels among the pixels $21_{1,1}$ to $21_{m,n}$ of the pixel array section 14 are skipped during a readout, time required for generating one image is shorter than that in the case of the all-pixel readout. Therefore, the sub-sampling reading is advantageous when it is desired to perform imaging at a high speed or to perform imaging at low power consumption, although it provides low resolution.

Sub-sampling reading involves ½ sub-sampling or ¼ sub-sampling depending on the sub-sampling ratio employed. A sub-sampling ratio is the ratio of the number of rows read out in the vertical direction to the total number of rows read rather than the ratio of the number of pixels read out (or skipped) to the total number of pixels. For example, ½ sub-sampling is sub-sampling reading to reduce the number of rows read in the vertical direction to ½ of the total number of rows. ¼ sub-sampling is sub-sampling reading to reduce the number of rows read in the vertical direction to ¼ of the total number of rows.

Example of Sub-Sampling Reading (1, 3) sub-sampling that is a version of ½ sub-sampling will now be described with reference to FIG. 3.

For example, the first pixel read out according to (1, 3) sub-sampling or the starting point of the scheme is the pixel $21_{1,1}$. After the pixel $21_{1,1}$ is read out, the next pixel to be read out is the pixel $21_{2,1}$ that is reached by shifting the readout position by one pixel in the row direction from the pixel $21_{1,1}$ (the pixel $21_{2,1}$ neighbors the pixel $21_{1,1}$ on the right side thereof in FIG. 2). After the pixel $21_{2,1}$ is read out, the next pixel to be read out is the pixel $21_{5,1}$ that is reached by shifting the readout position by three pixels in the row direction from the pixel $21_{2,1}$. After the pixel $21_{5,1}$ is read out, the next pixel to be read out is the pixel $21_{6,1}$ that is reached by shifting the readout position by one pixel in the row direction from the pixel $21_{5,1}$. The pixels 21 are thereafter similarly read out up to the pixel $21_{m,1}$ at the end of the first row by shifting the readout position by the alternating shifting amounts of one pixel and three pixels.

When the readout of the pixels 21 in the first row is finished, the pixels $21_{1,2}$ to $21_{m,2}$ of the second row are read out in the same way as in the first row. Specifically, the pixels 21 in that row are sequentially read out with the readout position shifted in the alternating shifting amounts of one pixel and three pixels.

When the readout of the pixels 21 in the second row is finished, the pixels $21_{1,5}$ to $21_{m,5}$ of the fifth row, which is reached by shifting the readout position by three rows from the second row in the vertical direction, are read out in the same way as in the first row. Specifically, the pixels 21 in that row are sequentially read out with the readout position shifted in the alternating shifting amounts one pixel and three pixels. That is, pixels to be read out are selected using the alternating shifting amounts of one pixel and three pixels also in the vertical direction.

That is, the numerals 1 and 3 of the term "(1,3) sub-sampling" indicate that the amount of a shift to be made to reach the next pixel or row to be read out alternates between 1 and 3.

The number of pixels read out according to (1,3) sub-sampling is ½ of the number of pixels read out according to all-pixel readout in both of the vertical and horizontal directions. Therefore, resolution achievable with (1,3) sub-sampling is ¼ of the resolution achievable with all-pixel readout. When the column A/D conversion method is employed, the frame rate is inversely proportionate only to the number of rows which are read out, the frame rate achievable with (1,3) sub-sampling is twice the frame rate achievable with all-pixel readout.

Figure 3:
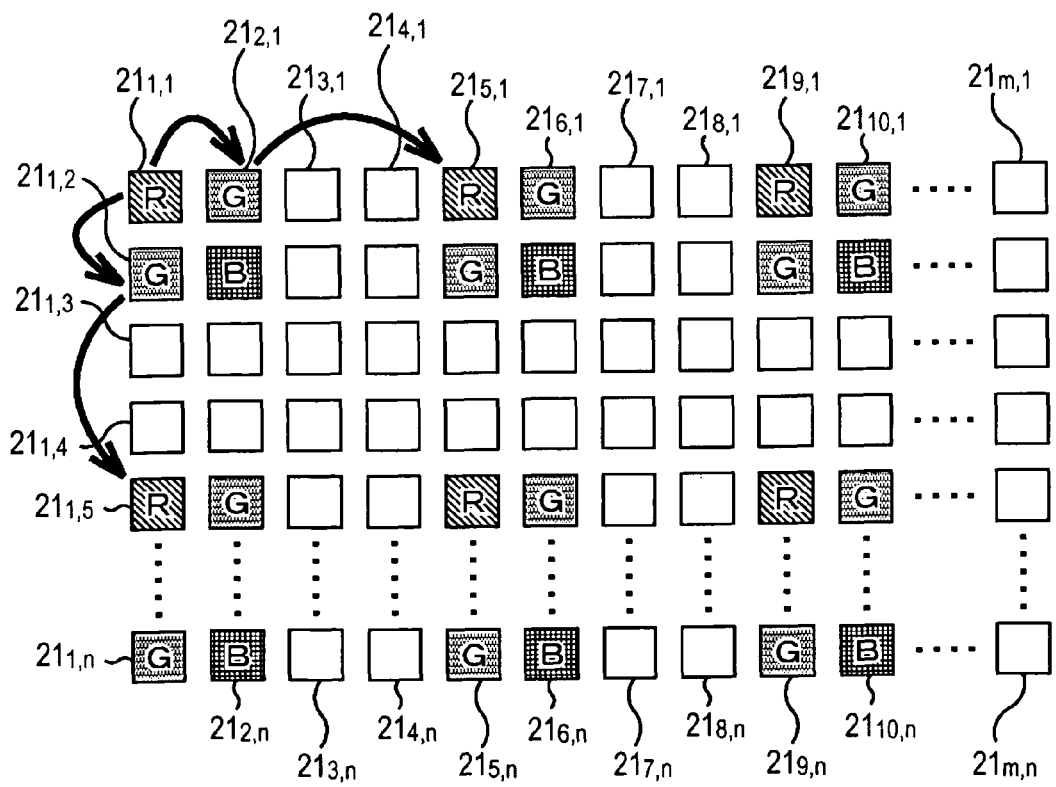
FIG. 3 is an illustration for explaining (1,3) sub-sampling.

As will be apparent from FIG. 3, when (1,3) sub-sampling is employed, sets of rows each including two rows to be read out and sets of rows each including two rows to be skipped alternate in the vertical direction. The reason for alternating two rows to be read out and two rows to be skipped in the vertical direction is that the CMOS image sensor 11 employs the Bayer arrangement.

Specifically, in the Bayer arrangement, GB rows each including alternately arranged G and B pixels 21 and GR rows each including alternately arranged G and R pixels 21 are disposed so as to alternate with each other in the vertical direction. Therefore, a GB row and a GR row adjacent thereto must be treated as a set when electrical charges are to be read out from them. For this reason, a setting is made such that two consecutive rows to be read out and two consecutive rows to be skipped alternate with each other.

What is required is only to prevent GB rows or GR rows adjacent to each other from being consecutively read out, and it is not essential to read out all pairs of a GB row and a GR row adjacent to each other. Therefore, ½ sub-sampling can be achieved also using (3,1) sub-sampling.

Figure 4:
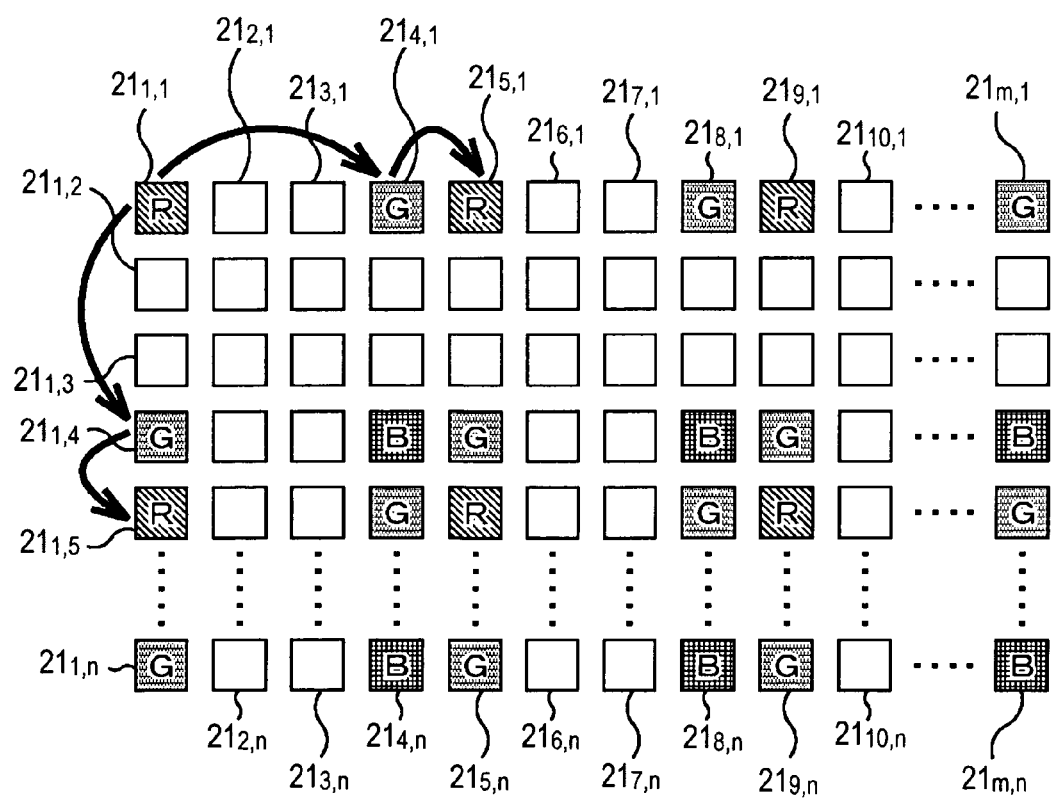
FIG. 4 is an illustration for explaining (3,1) sub-sampling.

(3,1) sub-sampling will now be described with reference to FIG. 4.

The numerals 3 and 1 of the term "(3,1) sub-sampling" indicate intervals (the number of pixels) between pixels 21 to be read out. Therefore, when the first pixel read out (starting point) is the pixel $21_{1,1}$, the next pixel to be read out is the pixel $21_{4,1}$ that is reached by shifting the readout position by three pixels in the row direction (to the right in FIG. 4) from the pixel $21_{1,1}$. After the pixel $21_{4,1}$ is read out, the next pixel to be read out is the pixel $21_{5,1}$ that is reached by shifting the readout position by one pixel in the row direction (to the right in FIG. 4) from the pixel $21_{4,1}$. After the pixel $21_{5,1}$ is read out, the next pixel to be read out is the pixel $21_{8,1}$ that is reached by shifting the readout position by three pixels in the row direction from the pixel $21_{5,1}$. The pixels 21 are thereafter similarly read out up to the pixel $21_{m,1}$ at the end of the first row with the readout position shifted in the alternating shifting amounts of one pixel and three pixels.

Pixels to be read out are selected using the alternating shifting amounts of one pixel and three pixels also in the vertical direction. Therefore, when the readout of the pixels 21 in the first row is finished, readout is sequentially performed on the pixels 21 in the fourth row that is reached by another shift of the readout position by three rows in the vertical direction, the pixels 21 in the fifth row that is reached by another shift of the readout position by one row, the pixels 21 in the eighth row that is reached by still another shift of the readout position by three rows, and the pixels 21 in the ninth row that is reached by still another shift of the readout position by one row. The operation is similarly repeated for the subsequent rows.

The number of pixels read out according to (3,1) sub-sampling is ½ of the number of pixels read out according to all-pixel readout in both of the vertical and horizontal directions. Therefore, resolution achievable with (3,1) sub-sampling is ¼ of the resolution achievable with all-pixel readout.

Although not shown, ¼ sub-sampling similarly includes four variations, i.e., (1,7) sub-sampling, (3,5) sub-sampling, (5,3) sub-sampling, and (7,1) sub-sampling which employ different ways of selecting pixels to be read out.

Relationships between readout operations and exposure times will now be described.

[Relationship between All-Pixel Readout and Exposure Time]

First, a description will be made on a relationship between all-pixel readout and an exposure time as the basis for the discussion of the present embodiment.

Figure 5:
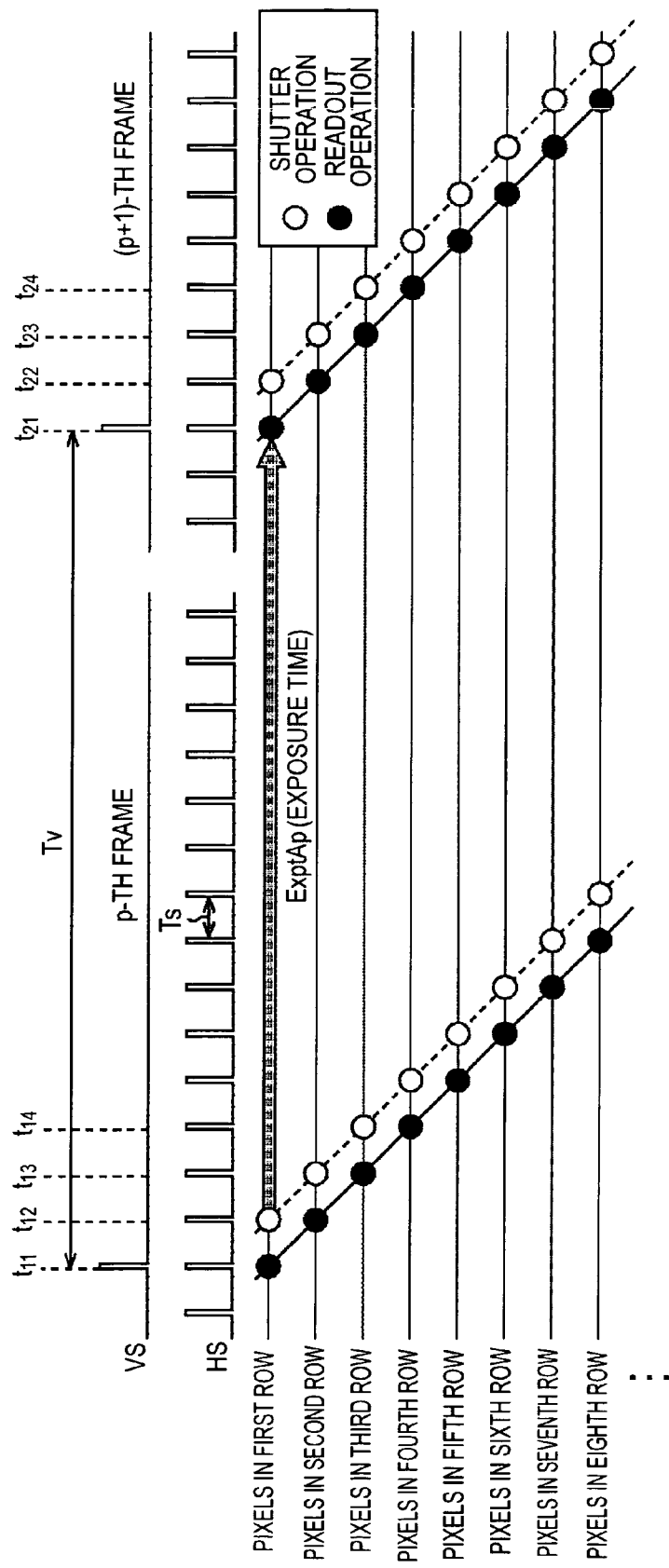
FIG. 5 is an illustration for explaining a relationship between all-pixel readout and exposure times.

FIG. 5 is a timing chart for shutter operations and readout operations during an all-pixel readout.

Referring to FIG. 5, a vertical synchronization signal VS is at a signal which is a high level for a predetermined period at the beginning of a frame. Therefore, the period between a time at which the vertical synchronization signal VS becomes the high level and a time at which the signal subsequently becomes the high level is a period required for processing one frame (hereinafter referred to as "one frame period"). One frame period involved in all-pixel readout is represented by Tv.

A horizontal synchronization signal HS is a signal which is at a high level for a predetermined period at the beginning of each row. Therefore, the period between a time at which the horizontal synchronization signal HS becomes the high level and a time at which the signal subsequently becomes the high level is a period required for processing one row (one horizontal period), and the period is represented by Ts.

What is required to maintain an exposure time at the maximum is to perform a readout operation following a shutter operation at the moment immediately before the next shutter operation. Therefore, when it is assumed that one each shutter operation and readout operation is performed once for each row during one frame period and that the shutter operation and the readout operation are performed substantially at the same time, the maximum expose time equals one frame period Tv.

In practice, a shutter operation as a countermeasure for blooming may be performed in addition to a shutter operation which determines an actual exposure time. However, the present embodiment will be described on an assumption that such an extra shutter operation is not performed. Referring to the shutter operating method, the rolling shutter method is used in which the pixels 21 where a shutter operation is performed are shifted on a row-by-row basis as time passes rather than the global shutter method in which a shutter operation is simultaneously performed at all of the pixels 21 two-dimensionally arranged at the pixel array section 14.

For example, in the case of all-pixel readout, an operation of reading out the pixels 21 in the first row is performed at a time $t_{11}$ which is the beginning of a p-th frame (p>1). Specifically, a readout operation for reading out electrical charges accumulated in a (p−1)-th frame preceding the p-th frame (or an operation of ending exposure) is performed at the pixels 21 in the first row at a time $t_{11}$. At a time $t_{12}$ which comes after one horizontal period Ts following the time $t_{11}$, a shutter operation for resetting the accumulated electrical charges (or an operation of starting exposure) is performed at the pixels 21 in the first row. At the time $t_{12}$, a readout operation for reading out electrical charges accumulated in the (p−1)-th frame is performed at the pixels 21 in the second row.

At a subsequent time $t_{13}$, a shutter operation for the pixels 21 in the second row and a readout operation for the pixels 21 in the third row are performed.

Similarly, shutter operations for predetermined rows and readout operations for the rows following the predetermined rows respectively are simultaneously performed while shifting the rows to be processed each time one horizontal period Ts passes.

At a time $t_{21}$ when a (p+1)-th frame starts, a shutter operation is performed for the pixels 21 in an n-th row which is not shown, and a readout operation is also performed for reading out electrical charges accumulated at the pixels 21 in the first row in the p-th frame preceding the (p+1)-th frame. At a subsequent time $t_{22}$, a shutter operation for the pixels 21 in the first row and a readout operation for the pixels 21 in the second row are performed.

Similarly, shutter operations for predetermined rows and readout operations for the rows following the predetermined rows respectively are simultaneously performed while shifting the rows to be processed each time one horizontal period Ts passes.

As will be apparent from the above description, in the all-pixel readout mode, an exposure time $ExptA_p$ for the pixels 21 at which a shutter operation has been performed in the p-th frame is the period until a readout operation is performed in the (p+1)-th frame. The exposure time $ExptA_p$ equals one frame period Tv as described above when the period between the readout operation and the shutter operation (one horizontal period Ts) is ignored. An exposure time in the all pixel readout mode will be hereinafter indicated by an abbreviation "ExptA" without a suffix such as "$_p$" because the exposure time remains the same in each frame.

An exposure in the ½ sub-sampling mode according to the related art will now be described.

[Relationship between (1,3) Sub-sampling and Exposure Time According to the Related Art]

Figure 6:
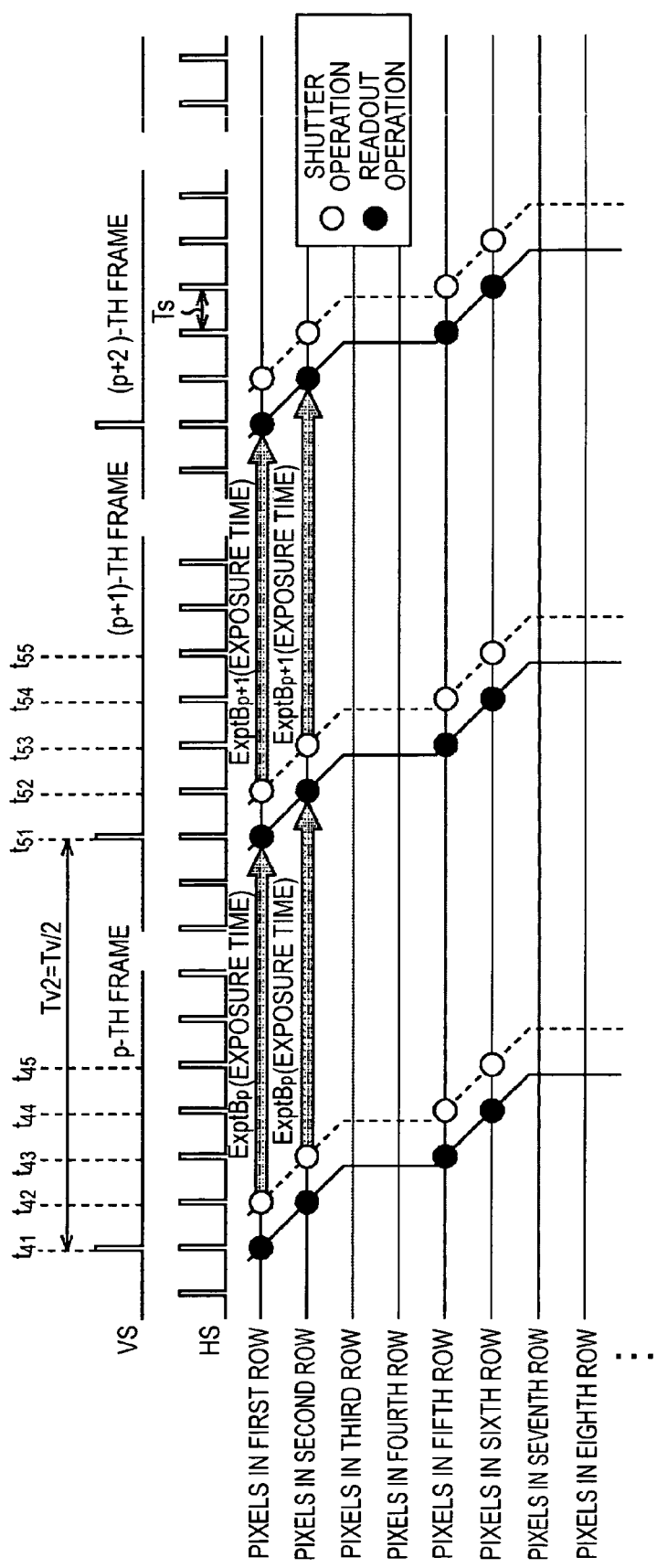
FIG. 6 is a timing chart of shutter operations and readout operations performed in a ½ readout mode according to the related art.

FIG. 6 is a timing chart for shutter operations and readout operations performed in the (1,3) sub-sampling mode that is a version of the ½ sub-sampling mode.

In the (1,3) sub-sampling mode, as described above, when the readout of the pixels 21 in the first row is finished, the pixels 21 in the second row that is shifted by one row from the first row in the vertical direction are read out. When the readout of the pixels 21 in the second row is finished, readout is performed on the pixels 21 in the fifth row that is shifted by further three rows in the vertical direction.

Therefore, a readout operation is performed on the pixels 21 in the first row at a time $t_{41}$ which is the beginning of the p-th frame, and a shutter operation is performed on the pixels at a subsequent time $t_{42}$. At the time $t_{42}$, an operation of reading out the pixels 21 in the second row is also performed.

At a subsequent time $t_{43}$, a shutter operation on the pixels 21 in the second row and a readout operation on the pixels 21 in the fifth row are performed.

Thereafter, the readout position is sequentially shifted to the sixth row, ninth row, tenth row, and so on which are determined as described above such that a shutter operation is performed on a row with a readout operation simultaneously performed on the next row to be read out.

At a time $t_{51}$ which is the beginning of the (p+1)-th frame, a shutter operation on the pixels 21 in the n-th row which is not shown and a readout operation on the pixels 21 in the first row are performed. At a subsequent time t52, a shutter operation on the pixels 21 in the first row and a readout operation on the pixels 21 in the second row are performed.

Thereafter, the processed position is shifted by either one pixel or three pixels each time one horizontal period Ts passes, the shifting amounts alternating in the order listed. Thus, a shutter operation on a row determined as described above is performed simultaneously with a readout operation on the next row to be read out.

As a result, the number of rows to be subjected to a shutter operation and a readout operation in the (1,3) sub-sampling mode is ½ of the number of rows read out in the all-pixel readout mode. One frame period Tv2 in the (1,3) sub-sampling mode is therefore one half of the one period Tv in the all-pixel readout mode (Tv2=Tv/2). That is, the frame rate in this mode is twice the frame rate in the all-pixel readout mode.

An exposure time $ExptB_p$ for the pixels 21 which is the period between the shutter operation in the p-th frame and the readout operation in the (p+1)-th frame is ½ of the exposure time $ExptA_p$ in the all-pixel readout mode. Therefore, the (1,3) sub-sampling mode has an exposure time ExptB which is ½ of the exposure time ExptA.

As thus described, since (1,3) sub-sampling according to the related art involves a shorter frame period and a shorter exposure time, pixels have lower sensitivity (or receive a smaller quantity of light).

[Relationship Between (1,3) Sub-Sampling Using CMOS Image Sensor 11 and Exposure Time]

Figure 7:
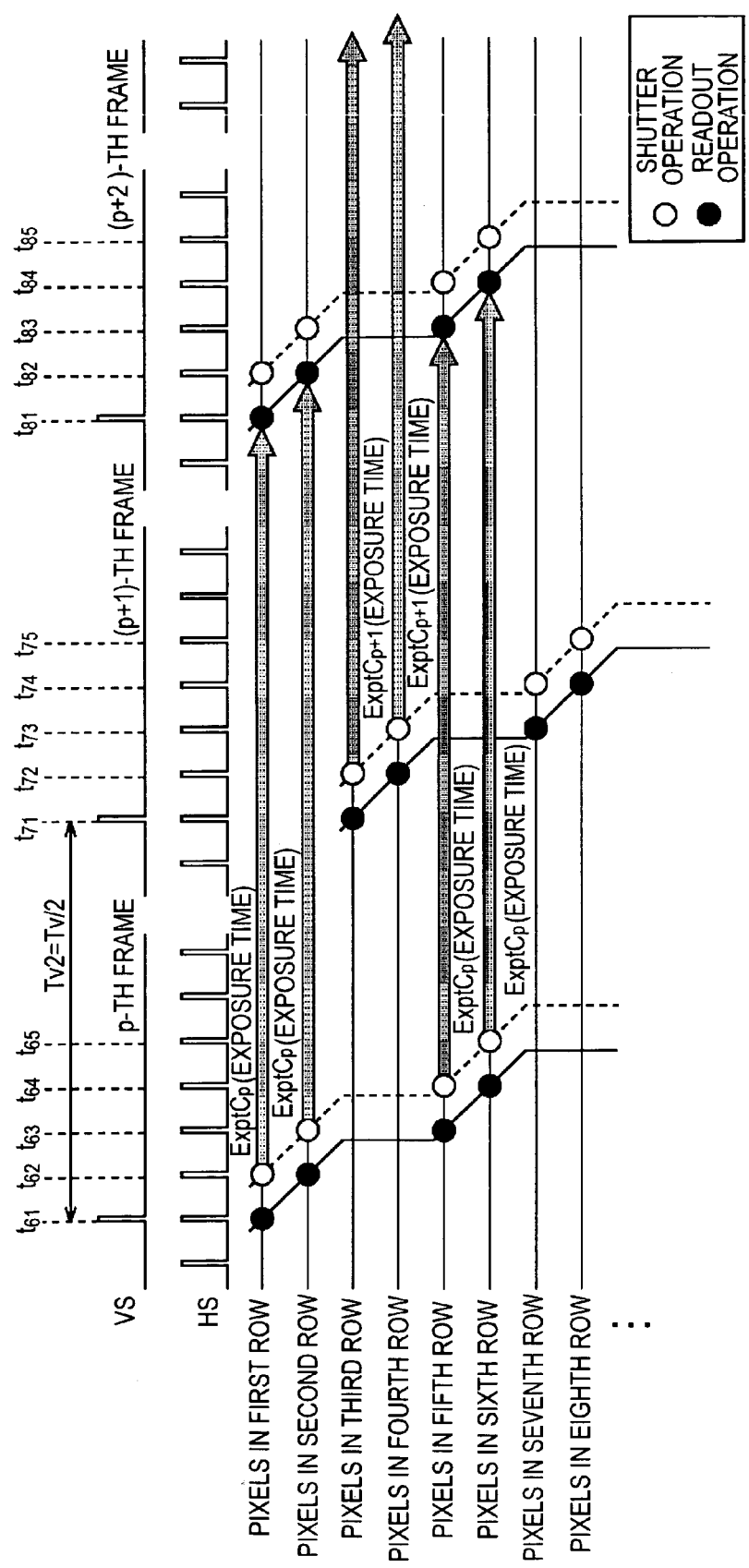
FIG. 7 is a timing chart of shutter operations and readout operations involved in (1,3) readout performed by the CMOS image sensor shown in FIG. 1.

Under the circumstance described above, the CMOS image sensor 11 performs (1,3) sub-sampling as shown in FIG. 7 to prevent any reduction in the sensitivity of pixels by achieving an exposure time similar to that in the all-pixel readout mode, although the duration of each frame time is reduced.

FIG. 7 shows a timing chart for shutter operations and readout operations involved in (1,3) sub-sampling performed by the CMOS image sensor 11.

When CMOS image sensor 11 performs (1,3) sub-sampling, a readout operation is performed on the pixels 21 in the first row at a time $t_{61}$ which is the beginning of the p-th frame, and a shutter operation on the pixels 21 in the first row is performed at a subsequent time $t_{62}$.

At a subsequent time $t_{63}$, a shutter operation on the pixels 21 in the second row and a readout operation on the pixels 21 in the fifth row are performed.

Similarly, the readout position is sequentially shifted to the sixth row, the ninth row, the tenth row, and so on such that a shutter operation on a row determined as thus described is performed simultaneously with a readout operation on the next row to be read out.

That is, operations performed in the p-th frame are similar to those in the (1,3) sub-sampling mode according to the related art described with reference to FIG. 6.

However, the (1,3) sub-sampling performed by the CMOS image sensor 11 is different from the (1,3) sub-sampling according to the related art in operations performed in the (p+1)-th frame.

In the (p+1)-th frame, shutter operations and readout operations are performed on the rows other than the rows on which shutter operations and readout operations have been performed in the p-th frame preceding the same.

Specifically, at a time $t_{71}$ which is the beginning of the (p+1)-th frame, a shutter operation is performed on the pixels 21 in the (n−1)-th row which is not shown, and a readout operation is performed on the pixels 21 in third row. At a subsequent time $t_{72}$, a shutter operation on the pixels 21 in the third row and a readout operation on the pixels 21 on the fourth row are performed.

At a subsequent time $t_{73}$, a shutter operation on the pixels 21 in the fourth row and a readout operation on the pixels 21 in the seventh row are performed. At a subsequent time $t_{74}$, a shutter operation on the pixels 21 in the seventh row and a readout operation on the pixels 21 in the eighth row are performed.

Meanwhile, exposure is continued in the (p+1)-th frame at the pixels 21 in the rows on which shutter operations and readout operations have been performed in the p-th frame.

In the subsequent (p+2)-th frame, at a time $t_{81}$, a shutter operation is performed on the pixels 21 in the (n−3)-th row which is not shown, and a readout operation is performed on the pixels 21 in the first row. At a subsequent time $t_{82}$, a shutter operation on the pixels 21 in the first row and a readout operation on the pixels 21 in the second row are performed.

At a subsequent time $t_{83}$, a shutter operation on the pixels 21 in the second row and a readout operation on the pixels 21 in the fifth row are performed. At a subsequent time $t_{84}$, a shutter operation on the pixels 21 in the fifth row and a readout operation on the pixels 21 in the sixth row are performed.

In the (p+2)-th frame, exposure is continued at the pixels 21 in the rows on which shutter operations and readout operations have been performed in the (p+1)-th frame.

As described above, when ½ sub-sampling is performed by the CMOS image sensor 11, rows of pixels of the pixel array section 14 to be subjected to shutter operations and readout operations are switched to render each frame, and a shutter operation and a readout operation are performed on all rows of pixels of the pixel array section 14 in the frame periods of two frames.

An exposure time $ExptC_p$ of the p-th frame is a period lasting for two frames, i.e., a period that passes after a shutter operation is performed in the p-th frame until a readout operation is performed in the (p+2)-th frame. Since the exposure time $ExptC_p$ is twice the one frame period Tv2, it is equal to the one frame period Tv in the all-pixel readout mode. That is, the exposure time $ExptC_p$ equals the exposure time $ExptC_p$. Therefore, when the CMOS image sensor 11 performs ½ sub-sampling, the same exposure time as that in the all-pixel readout mode can be provided for the pixels 21 in each row, and any reduction in the sensitivity of pixels can therefore be prevented.

While readout control (driving control) according to the embodiment has been described above by exemplifying it in the case of ½ sub-sampling, such control may be used in other modes of sub-sampling reading such as ¼ sub-sampling and ⅛ sub-sampling. The embodiment will now be described on an assumption that it is applied to ¼ sub-sampling.

[Exposure Time in All-pixel Readout Mode]

Figure 8:
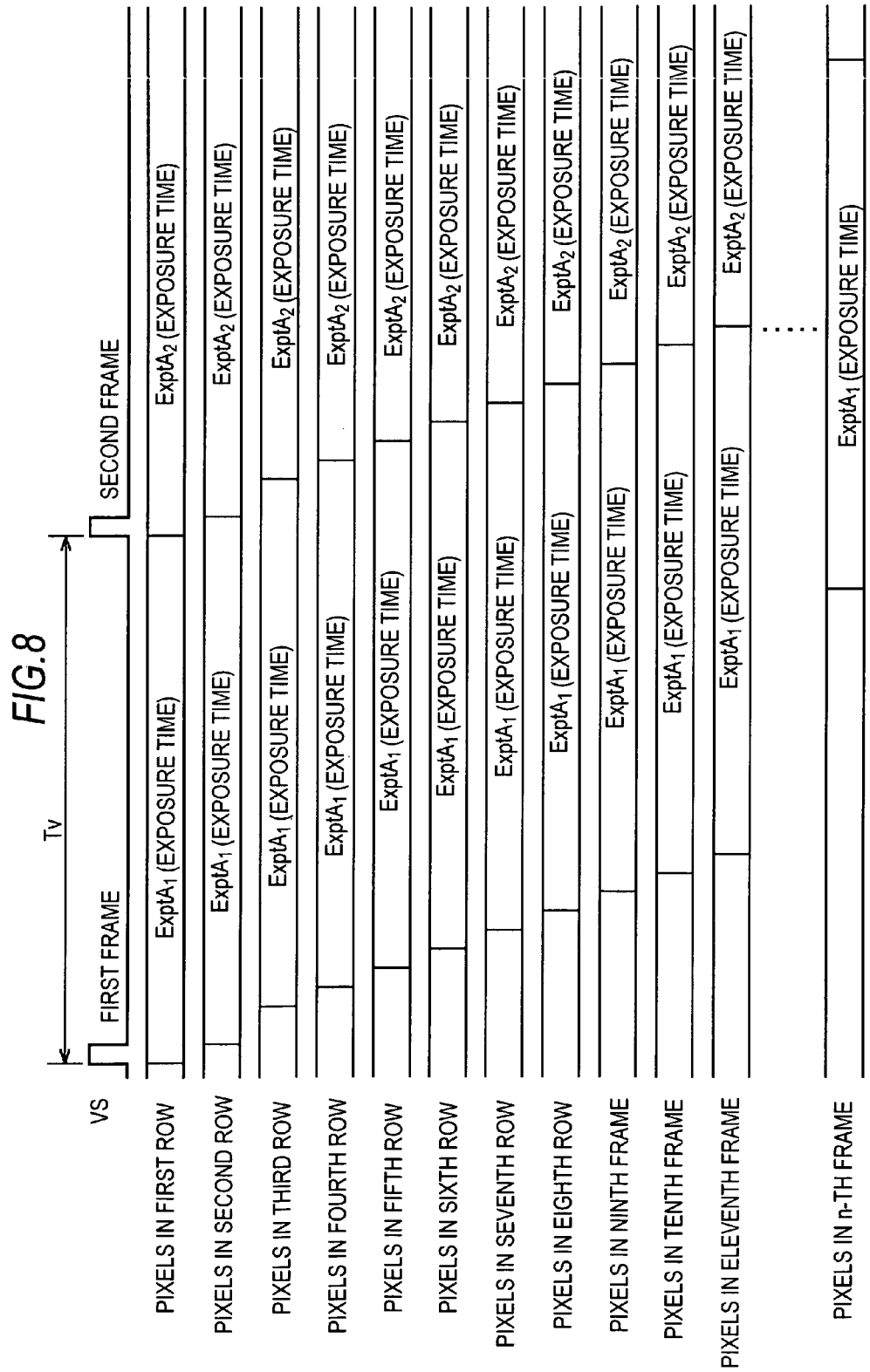
FIG. 8 is a modified version of FIG. 6 showing exposure times only.

FIG. 8 is a version of the timing chart for shutter operations and readout operations in the all-pixel readout mode shown in FIG. 6 obtained by modifying FIG. 6 to show only exposure times.

In FIG. 8, the horizontal synchronization signals HS are omitted. For simplicity of description, more specific frame designations, i.e., the first frame and so on are used in FIG. 8. This equally applies to FIGS. 9 to 11 which will be described later.

As described above with reference to FIG. 5, when all-pixel readout is performed, any of the rows of the pixel array section 14 is exposed for an exposure time ExptA (=ExptA$_1$=ExptA$_2$), and the exposure time is approximately equal to one frame time Tv when the period (one horizontal period Ts) between a readout operation and a shutter operation is ignored.

[Exposure Time in (1,7) Sub-sampling Mode According to the Related Art]

Figure 9:
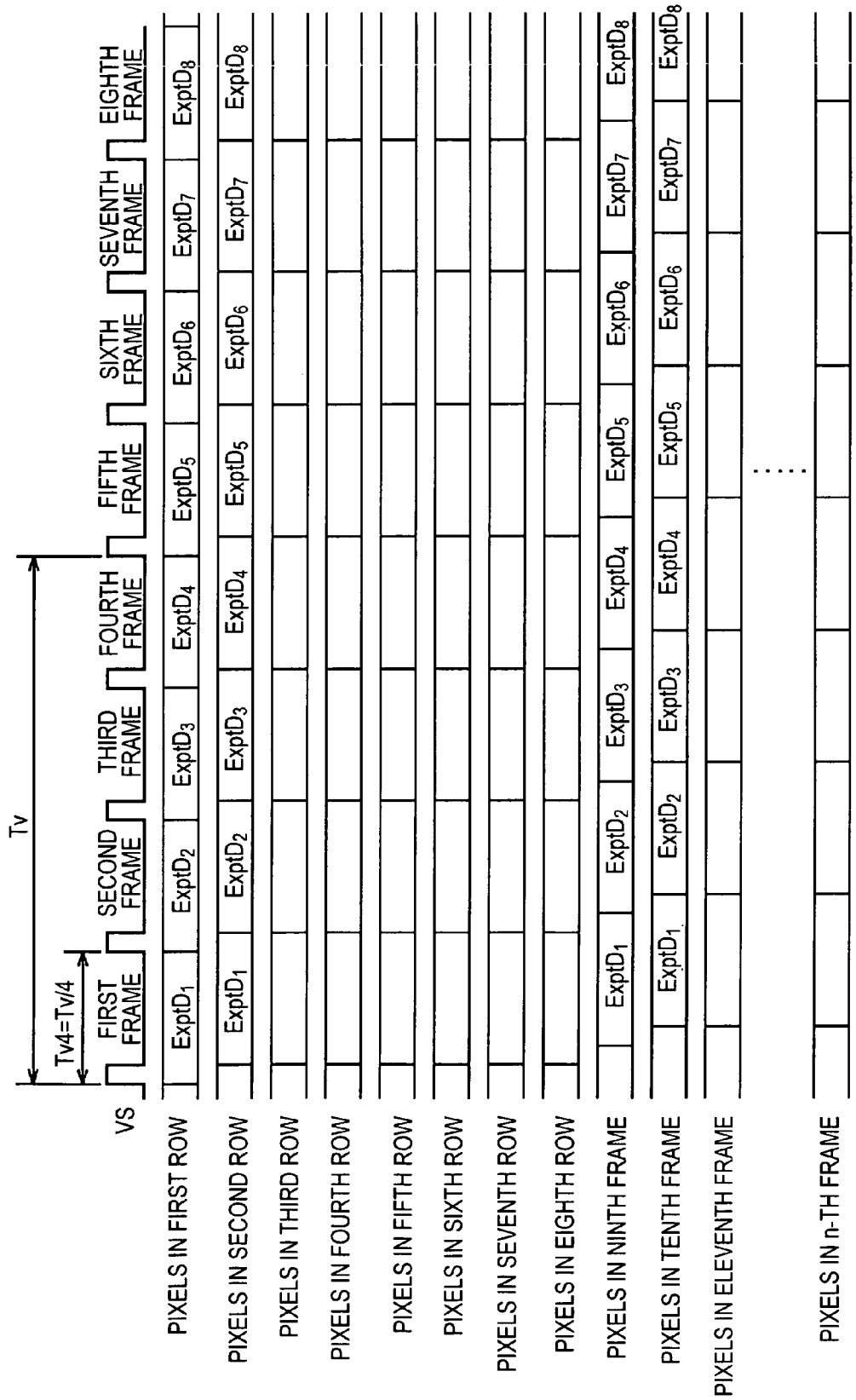
FIG. 9 is a diagram showing exposure times in a (1,7) sub-sampling mode according to the related art.

FIG. 9 shows exposure times in a (1,7) sub-sampling mode according to the related art in the same way as in FIG. 8.

In the (1,7) sub-sampling mode according to the related art, after a shutter operation and a readout operation are performed on the first and second rows, the process skips the third to eighth rows to perform a shutter operation and a readout operation on the ninth and tenth rows. Thereafter, the process similarly proceeds to perform a shutter operation and a readout operation on the 17th row, 18th row, 25th row, 26th row, and so on sequentially.

Therefore, the number of rows to be subjected to a shutter operation and a readout operation in the (1,7) sub-sampling mode according to the related art is ¼ of that in the all-pixel readout mode. Therefore, one frame period Tv4 in this mode is ¼ of one frame period Tv in the all-pixel readout mode (Tv4=Tv/4). That is, the frame rate of the (1,7) sub-sampling is four times the frame rate of the all-pixel readout.

When a shutter operation and a readout operation are performed on each row, the row is exposed for an exposure time ExptD that is equal to one frame time Tv in the (1,7) sub-sampling mode when the period between the readout operation and the shutter operation associated with the row is ignored. In FIG. 9, exposure times ExptD$_1$, ExptD$_2$, ExptD$_3$, ExptD$_4$, and so on are exposure times ExptD of the first frame, second frame, third frame, fourth frame, and so on, respectively.

As thus described, in the (1,7) sub-sampling mode according to the related art, one frame period and hence exposure times in the (1,7) sub-sampling mode are as short as ¼ of those in the all-pixel readout mode, which results in a corresponding reduction in the sensitivity of pixels.

[Exposure Time in (1,7) Sub-sampling Mode of CMOS Image Sensor 11]

Figure 10:
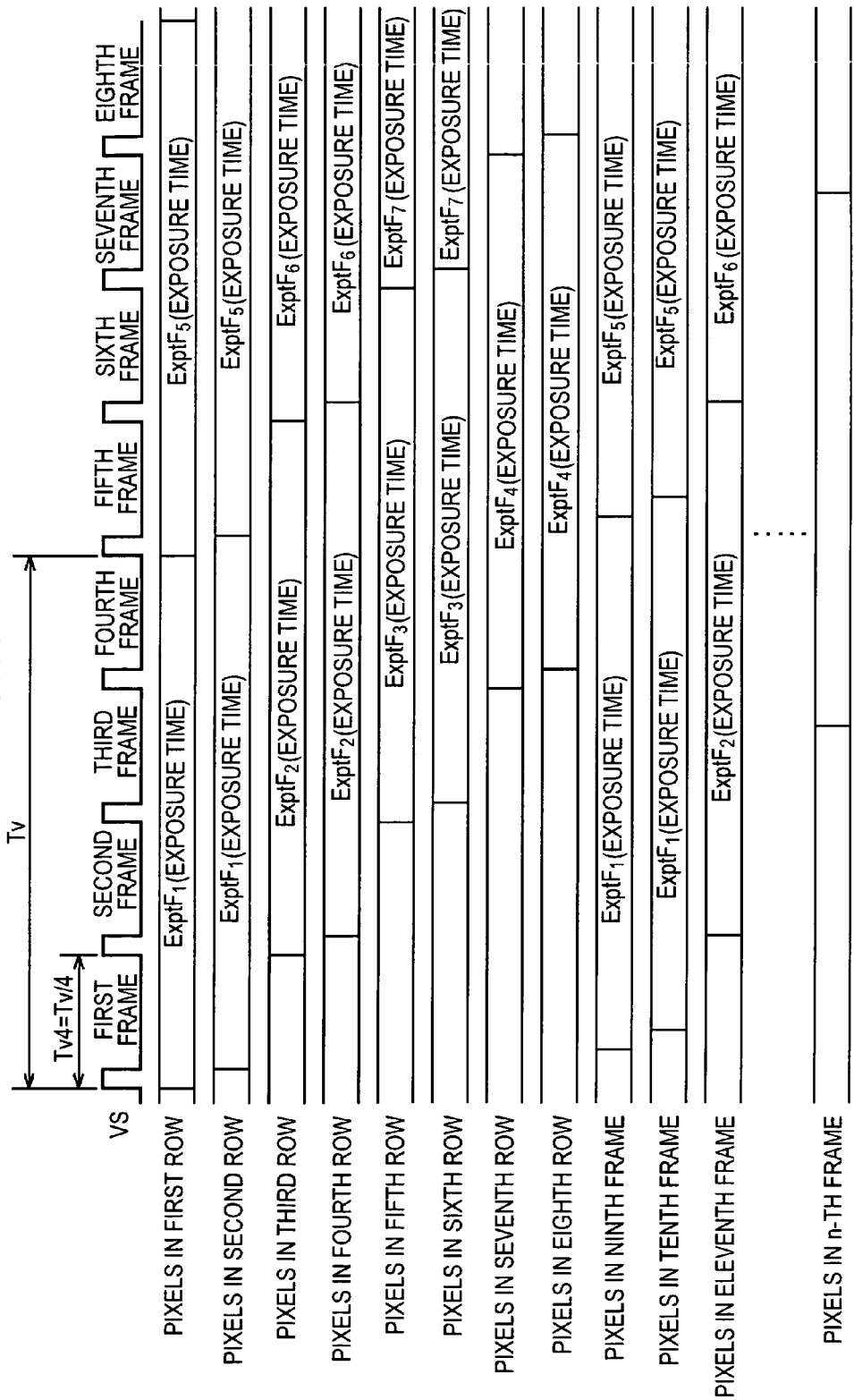
FIG. 10 is a diagram showing exposure times in a (1,7) sub-sampling mode of the CMOS image sensor shown in FIG. 1.

FIG. 10 show exposure times in the (1,7) sub-sampling mode of the CMOS image sensor 11 in the same manner as in FIG. 8.

When (1,7) sub-sampling is performed by the CMOS image sensor 11, a shutter operation and a readout operation are sequentially performed in the first row, the second row, the ninth row, the tenth row, the 17th row, the 18th row, the 25th row, the 26th row, and so on in the frame period Tv4 of the first frame.

A shutter operation and a readout operation are sequentially performed in the third row, the fourth row, the 11th row, the 12th row, the 19th row, the 20th row, the 27th row, the 28th row, and so on in the frame period Tv4 of the second frame.

A shutter operation and a readout operation are sequentially performed in the fifth row, the sixth row, the 13th row, the 14th row, the 21st row, the 22th row, the 29th row, the 30th row, and so on in the frame period Tv4 of the third frame.

A shutter operation and a readout operation are sequentially performed in the seventh row, the eighth row, the 15th row, the 16th row, the 23rd row, the 24th row, the 31st row, the 32th row, and so on in the frame period Tv4 of the fourth frame.

A shutter operation and a readout operation are sequentially performed again in the first row, the second row, the ninth row, the tenth row, the 17th row, the 18th row, the 25th row, the 26th row, and so on in the frame period Tv4 of the fifth frame.

As a result, each row subjected to a shutter operation and a readout operation is exposed for an exposure time ExptF that is four times longer than one frame time Tv4 or equal to one frame time Tv in the all-pixel readout mode.

Thus, the exposure time is equal to the exposure time ExptA. In FIG. 9, exposure times ExptF$_1$, ExptF$_2$, ExptF$_3$, ExptF$_4$, and so on are exposure times ExptF starting at the first frame, second frame, third frame, fourth frame, and so on, respectively.

Therefore, since the (1,7) sub-sampling reading performed by the CMOS image sensor 11 provides exposure times lasting for four frames, an exposure time having the same duration as that in the all-pixel mode can be provided for each pixel 21 even through ¼ sub-sampling is carried out. Thus, any reduction in the sensitivity of pixels can be prevented.

[Exposure Time in (3,5) Sub-sampling Mode of CMOS Image Sensor 11]

Figure 11:
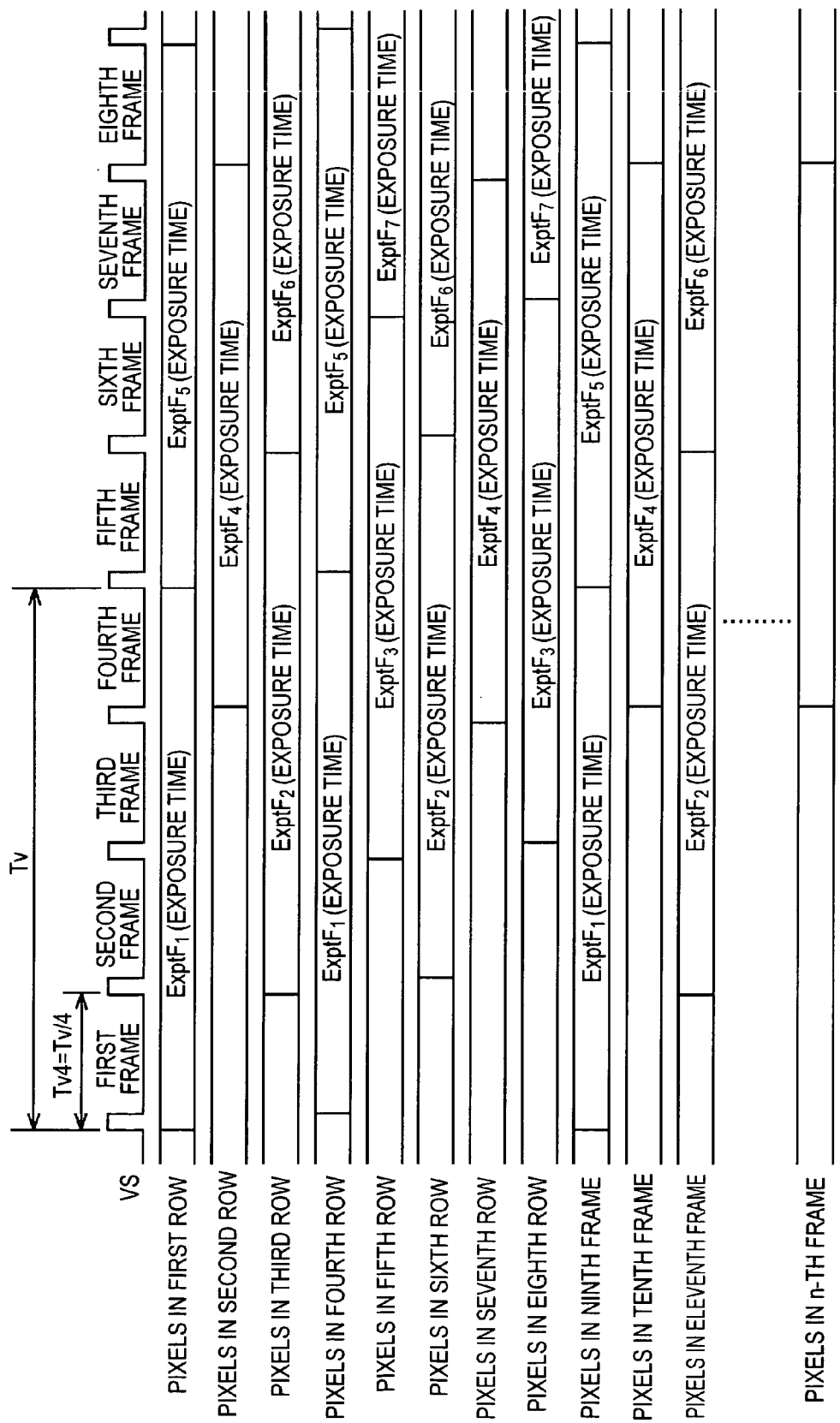
FIG. 11 is a diagram showing exposure times in a (3,5) sub-sampling mode of the CMOS image sensor shown in FIG. 1.

FIG. 11 is a diagram showing exposure times in a (3,5) sub-sampling mode of the CMOS image sensor 11 in the same manner as in FIG. 8.

In the (3,5) sub-sampling mode, the amount of a shift (the number of pixels) to be made to reach the next row to be read out repeatedly alternates between 3 and 5, as described above.

When (3,5) sub-sampling is performed by the CMOS image sensor 11, a shutter operation and a readout operation are sequentially performed on the first row, the fourth row, the ninth row, the 12th row, the 17th row, the 20th row, the 25th row, the 28th row, and so on in the frame period Tv4 of the first frame.

A shutter operation and a readout operation are sequentially performed on the third row, the sixth row, the 11th row, the 14th row, the 19th row, the 22nd row, the 27th row, the 30th row, and so on in the frame period Tv4 of the second frame.

A shutter operation and a readout operation are sequentially performed on the fifth row, the eighth row, the 13th row, the 16th row, the 21st row, the 24th row, the 29th row, the 32nd row, and so on in the frame period Tv4 of the third frame.

A shutter operation and a readout operation are sequentially performed on the second row, the seventh row, the tenth row, the 15th row, the 18th row, the 23rd row, the 26th row, the 31st row, and so on in the frame period Tv4 of the fourth frame.

A shutter operation and a readout operation are sequentially performed again on the first row, the fourth row, the ninth row, the 12th row, the 17th row, the 20th row, the 25th row, the 28th row, and so on in the frame period Tv4 of the fifth frame.

As a result, when (3,5) sub-sampling reading is performed by the CMOS image sensor 11, each row is exposed for an exposure time ExptF which is equal to one frame time Tv in the all-pixel readout mode, just like the exposure time in the (1,7) sub-sampling mode shown in FIG. 10.

Therefore, the same exposure time as that in the all-pixel readout mode can be achieved at each pixel 21 of the CMOS image sensor 11 also when the sensor performs (3,5) sub-sampling reading that is another example of ¼ sub-sampling. Thus, any reduction in the sensitivity of pixels can be prevented.

Readout control exercised by the CMOS image sensor (which may be hereinafter referred to as "readout control according to the embodiment) allows the same exposure time as in the all-pixel readout mode to be achieved even when sub-sampling ratios ½ and ¼ as described above or other sub-sampling ratio such as ⅛ are used.

When sub-sampling reading is performed by the CMOS image sensor 11 at a sub-sampling ratio of 1/Q (Q is a positive integer) as described above, readout control (driving control) is exercised to provide an exposure time lasting for Q frames for the pixels 21 in each row of the pixel array section 14. As a result, the same exposure time as that in the all-pixel readout mode can be achieved regardless of the sub-sampling ratio employed.

Although the above embodiment has been described as an example in which an exposure time equivalent to a maximum exposure time Tv in the all-pixel readout mode is provided, the CMOS image sensor 11 can exercise similar readout control even in the case of an exposure time shorter than one frame time Tv.

For simplicity of description, it is assumed that the above-described embodiment involves only shutter operations determining exposure times and excludes other shutter operations performed as measures against blooming and the like. However, readout control can be similarly exercised even when shutter operations are performed as measures against blooming and the like.

Other Examples of CMOS Image Sensor Embodying the Invention

In the above description of the embodiment, it has been explained that the CMOS image sensor 11, which is a solid-state imaging device employing the column A/D conversion method, is capable of achieving the same exposure time as that in the all-pixel readout mode regardless of the sub-sampling ratio employed. However, the readout control according to the embodiment is not limited to solid-state imaging devices employing the column A/D conversion method, and the control may be used in CMOS image sensors or solid-state imaging devices as shown in FIGS. 12 and 13.

Figure 12:
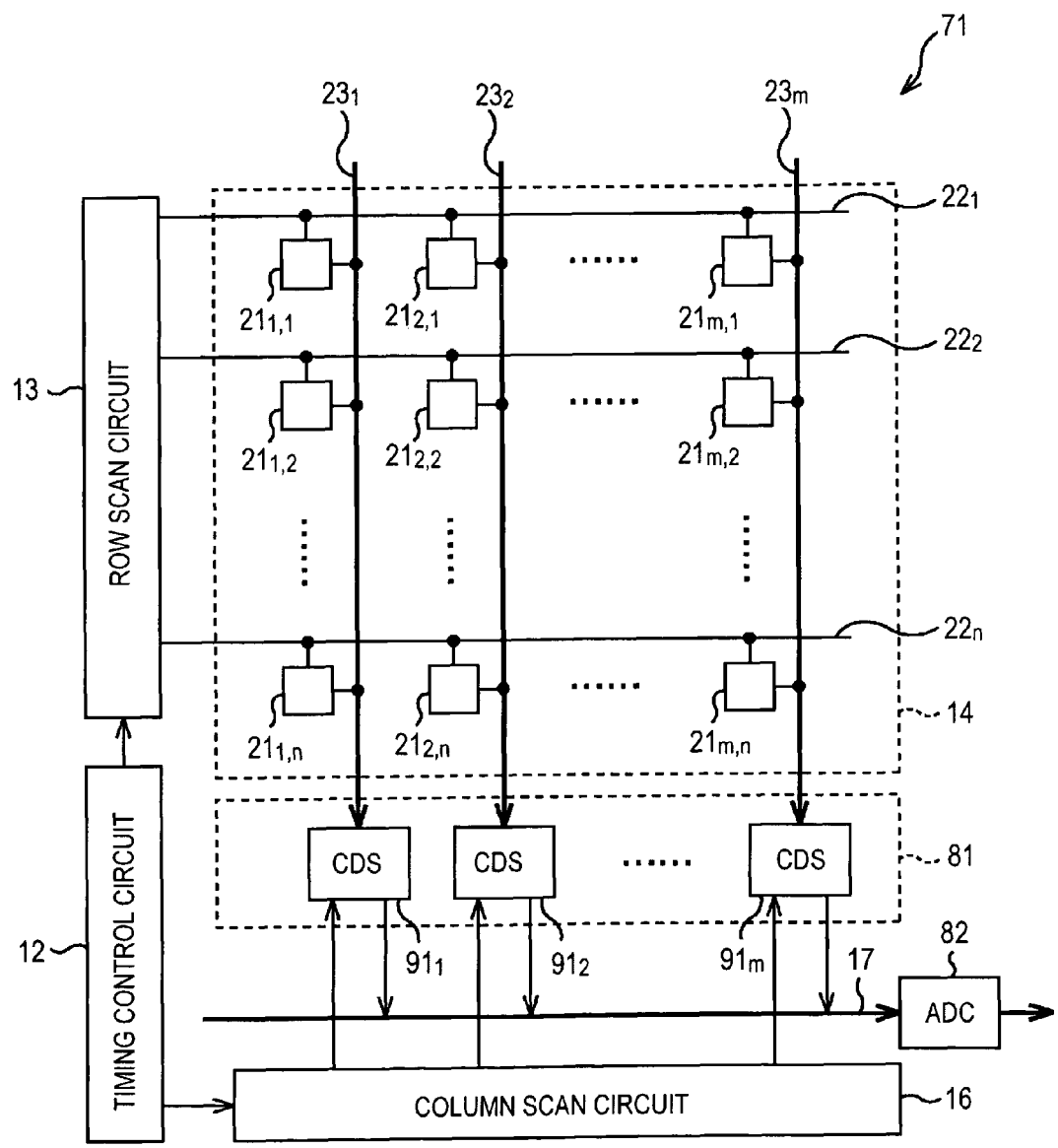
FIG. 12 is a diagram showing an exemplary configuration of another CMOS image sensor employing the invention.
Figure 13:
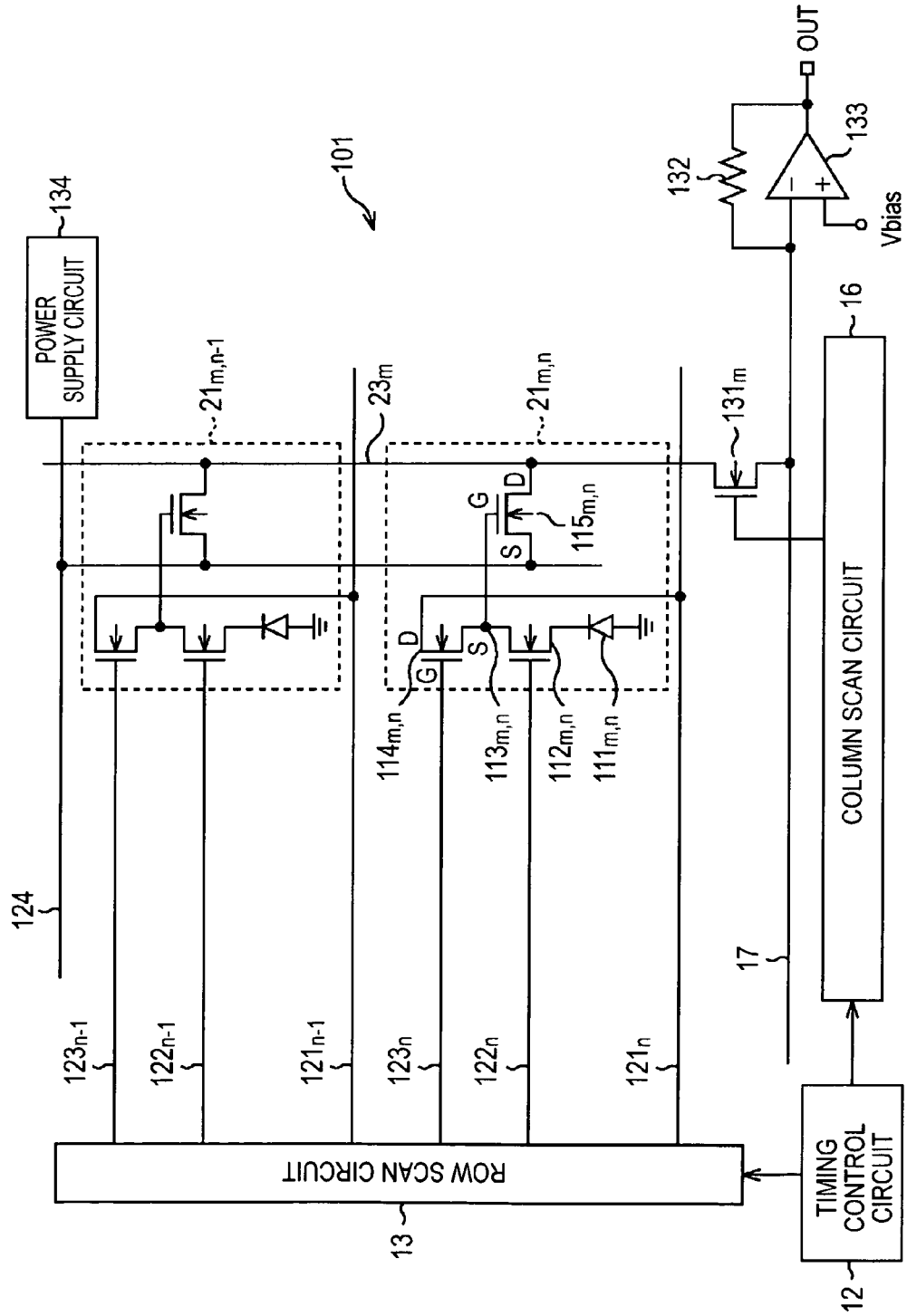
FIG. 13 is a diagram showing an exemplary configuration of still another CMOS image sensor employing the invention.

FIG. 12 shows an exemplary configuration of a CMOS image sensor 71 that is another solid-state imaging device in which the readout control according to the embodiment can be exercised.

Parts of the sensors shown in FIGS. 12 and 1 corresponding to each other are indicated by like reference numerals and will not be described below.

The CMOS image sensor 71 in FIG. 12 includes a CDS processing section 81 instead of the column processing section 15 in FIG. 1. The CMOS image sensor 71 also includes an ADC provided as a destination of output from a horizontal output line 17.

In the CMOS image sensor 11 in FIG. 1, m ADCs $24_1$ to $24_m$ are disposed in parallel as a column processing section 15. In the CMOS image sensor 71, m CDSs $91_1$ to $91_m$ are disposed in parallel.

The ADCs $24_1$ to $24m$ shown in FIG. 1 perform a CDS process and an A/D conversion process on pixel signals supplied from the pixels $21_{1,1}$ to $21_{1,n}$ and output resultant signals. The CDSs $91_1$ to $91_m$ in FIG. 12 perform only a CDS process on pixel signals supplied from pixels $21_{1,1}$ to $21_{1,n}$ and output resultant signals.

The pixel signals which have received the CDS process are sequentially supplied to the ADC 82 through the horizontal output line 17 under control exercised by a column scan circuit 16. The ADC 82 performs A/D conversion of the CDS-processed pixel signals supplied thereto and outputs resultant pixel data.

That is, the CMOS image sensor 71 in FIG. 12 is a CMOS image sensor of the so-called column CDS type in which a CDS is disposed for each column of pixels.

FIG. 13 shows an exemplary configuration of a CMOS image sensor 101 that is still another solid-state imaging device in which the readout control according to the embodiment can be exercised.

The CMOS image sensor 101 in FIG. 13 is a common CMOS image sensor, and parts of the sensors in FIGS. 13 and 1 corresponding to each other are indicated by like reference numerals and will not be described below.

FIG. 13 shows only part of pixels of a pixel array section 14, i.e., pixels $21_{m,n-1}$ and $21_{m,n}$. FIG. 13 also shows a photoelectric conversion element $111_{m,n}$ a transfer transistor $112_{m,n}$, an FD section $113_{m,n}$, a reset transistor $114_{m,n}$, and an amplifier transistor $115_{m,n}$, forming the pixel $21_{m,n}$, corresponding parts of the sensor 11 being omitted in FIG. 1.

A row scan circuit 13 is connected to the drain of the reset transistor $114_{m,n}$, through a row selection signal line $121_{m,n}$. The row scan circuit 13 is connected to the gate of the transfer transistor 112, and the gate of the reset transistor $114_{m,n}$ through the transfer selection signal line $122_n$ and a reset selection signal line $123_n$, respectively.

The photoelectric conversion element $111_{m,n}$, performs photoelectric conversion of incident light to obtain a signal charge having a charge amount corresponding to the quantity of the light, and the element accumulates the signal charge. The transfer transistor $112_{m,n}$ is connected between the photoelectric conversion element $111_{m,n}$, and the FD section $113_{m,n}$, to transfer the signal charge accumulated in the photoelectric conversion element $111_{m,n}$ to the FD section $113_{m,n}$. The FD section $113_{m,n}$ converts the transferred signal charge into a signal voltage and supplies the voltage to the gate of the amplifier transistor $115_{m,n}$.

The reset transistor $114_{m,n}$ is connected between the FD section $113_{m,n}$, and the row selection signal line $121_n$, and the transistor has the function of resetting an electric potential at the FD section $113_{m,n}$ to the electric potential (e.g., 3.3 V) of a pixel power supply. The amplifier transistor $115_{m,n}$ is connected between a power supply line 124 and a vertical signal line $23_m$, and the transistor amplifies the electric potential at the FD section $113_{m,n}$ and outputs the resultant potential to the vertical signal line $23_m$.

In the CMOS image sensor 101, a horizontal selection switch $131_m$ is disposed between an end of the vertical signal line $23_m$ and a horizontal signal line 17, and an operational amplifier 133 having feedback provided through a resistor 132 is disposed at an end of the horizontal signal line 17. That is, the electrical potential at the vertical signal line 23m and the horizontal signal line 17 is fixed at a certain potential (Vbias) by the operational amplifier 133 having feedback provided through a resistor 132. A power supply voltage supplied by a power supply circuit 134 to the pixel $21_{m, n}$ is decreased to cause the amplifier transistor $115_{m,n}$ at the pixel $21_{m,n}$ to operate linearly. As a result, pixel signals are output from pixels 21 in the current mode.

Although the exemplary configuration includes the power supply circuit 134 which is incorporated in the sensor to decrease the power supply voltage supplied to the pixels 21, the invention is not limited to such a configuration. For example, the amplifier transistor $115_{m,n}$ at the pixel $21_{m,n}$ can be made to operate linearly by decreasing a threshold voltage Vth of the amplifier transistor $115_{m,n}$.

The row scan circuit 13 and the column scan circuit 16 of the CMOS image sensor 71 shown in FIG. 12 and the CMOS image sensor 101 shown in FIG. 13 can be controlled by a timing control circuit 12 such that readout control according to the embodiment will be exercised also in the image sensors. As a result, the same exposure time as that in the all-pixel readout mode can be provided also when high-speed imaging based on sub-sampling reading is performed by the CMOS image sensors 71 and 101.

[Measures Against Vertical Offset]

When the readout control according to the embodiment is exercised, an offset in the vertical direction can occur between images of two consecutive frames. For example, when ½ sub-sampling is performed as shown in FIG. 7, the image of the p-th frame and the image of the (p+1)-th frame are offset from each other by two pixels in the vertical direction even when they are obtained by imaging the same fixed (non-moving) object.

Figure 14:
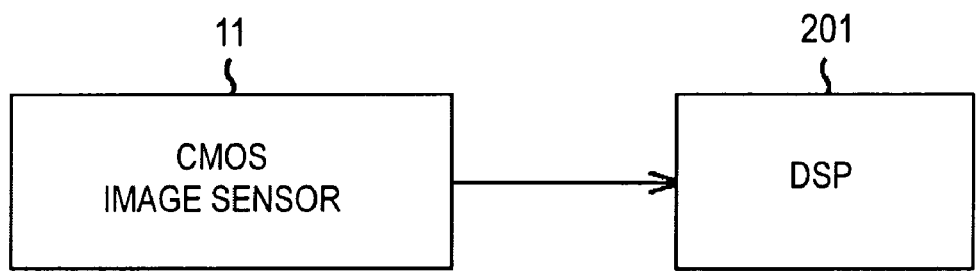
FIG. 14 is a diagram for explaining a process for correcting image offsets in the vertical direction.

For example, such a problem can be solved by disposing a DSP 201 downstream of the CMOS image sensor 11 as shown in FIG. 14 to perform a process for correcting an image offset such as hand-shake correction. It is known in advance that the CMOS image sensor 11 outputs images which are offset from each other by several pixels in the vertical direction depending on the sub-sampling ratio employed. Therefore, the pixel data may be output along with control information indicating that the images are offset from each other by several pixels.

Alternatively, the CMOS image sensor 11 may output images with such a vertical offset corrected by the sensor itself without relying on the DSP 201 or the like provided downstream of the same.

A process performed by the CMOS image sensor 11 to correct an image offset attributable to the readout control according to the embodiment will now be described by exemplifying the process in a case wherein (1,15) sub-sampling that is one version of ⅛ sub-sampling is carried out.

[Operations of (1,15) Sub-Sampling]

Figure 15:
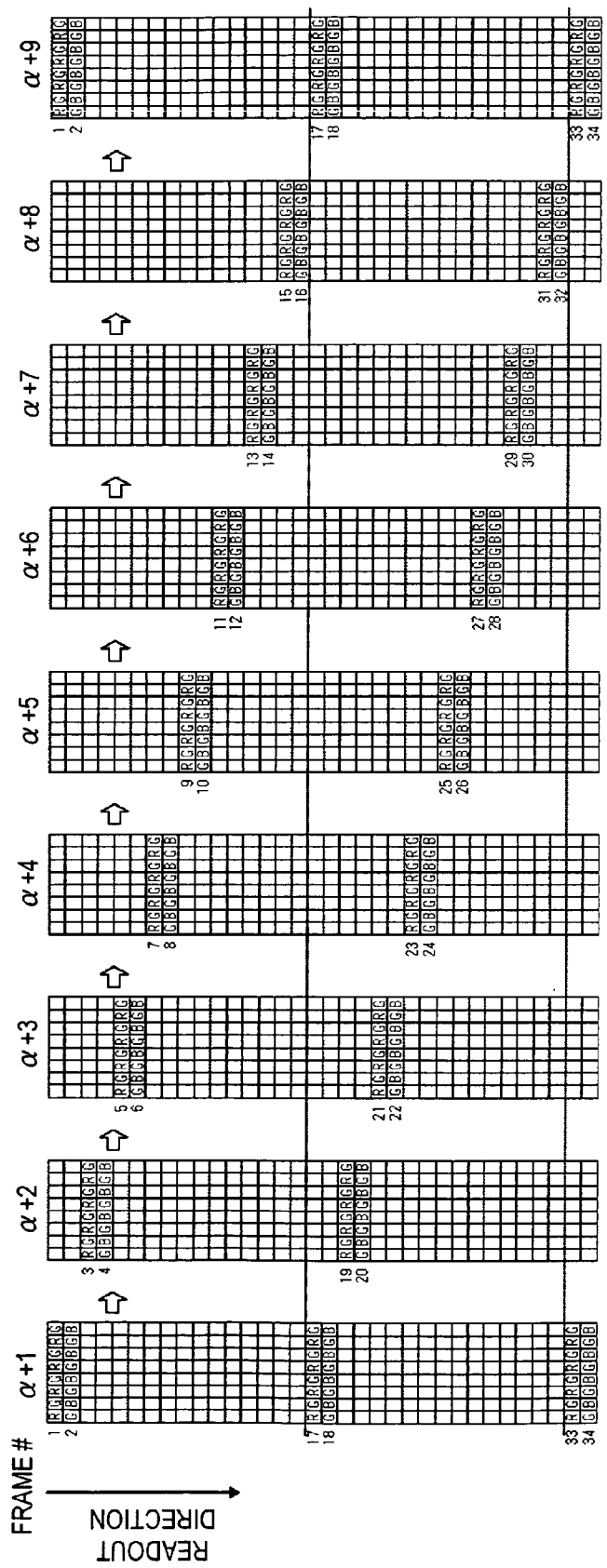
FIG. 15 is an illustration for explaining (1,15) sub-sampling.

First, (1,15) sub-sampling will be briefly described with reference to FIG. 15.

In the case of (1,15) sub-sampling, the amount of a shift (the number of pixels) to be made to reach the next row to be read out repeatedly alternates between 1 and 15.

For example, in an (α+1)-th frame, a shutter operation and a readout operation are sequentially performed on the first row, the second row, the 17th row, the 18th row, the 33rd row, the 34th row, and so on.

In the next frame or (α+2)-th frame, a shutter operation and a readout operation are sequentially performed on the third row, the fourth row, the 19th row, the 20th row, the 35th row, the 36th row, and so on.

In the (α+3)-th frame, a shutter operation and a readout operation are sequentially performed on the fifth row, the sixth row, the 21st row, the 22nd row, the 37th row, the 38th row, and so on.

Thereafter, shutter operations and readout operations are similarly performed and, in the (α+8)-th frame, a shutter operation and a readout operation are sequentially performed on the 15th row, the 16th row, the 31st, the 32nd row, the 47th row, the 48th row, and so on.

In the (α+9)-th frame, a shutter operation and a readout operation are sequentially performed again on the first row, the second row, the 17th row, the 18th row, the 33rd row, the 34th row, and so on.

When a comparison is made on readout positions corresponding between the (α+1)-th frame and the (α+8)-th frame which are the combination of frames furthest from each other in terms of readout positions, there is a difference of 15 pixels in the vertical direction. That is, there is an offset of 15/2=7.5 pixels between the output images in terms of the positions of the centers of gravity of the images.

[Image Offset Correcting Process Performed by CMOS Image Sensor 11]

The CMOS image sensor 11 outputs image data of output images after correcting any offset between the output images attributable to sub-sampling reading.

[Row to Output Image Data after Correction Process]

The CMOS image sensor 11 outputs pixel data at fixed rows such that the centers of gravity of output images will be in the same position regardless of the frames. That is, pixel data are output at fixed rows regardless of the rows from which the pixel data are read out. For example, the CMOS image sensor 11 outputs pixel data at the first row, the ninth row, the 17th row, the 25th row, and the 33rd row such that the pixel data will be output at rows which are equally spaced. Further, the CMOS image sensor 11 uses the first row, the 17th row, and the 33rd row as output rows for outputting pixel data of GB rows and uses the ninth row and the 25th row as outputting rows for outputting pixel data of GR rows. Data of rows excluded from the illustration are also output according to the same rule.

Figure 16:
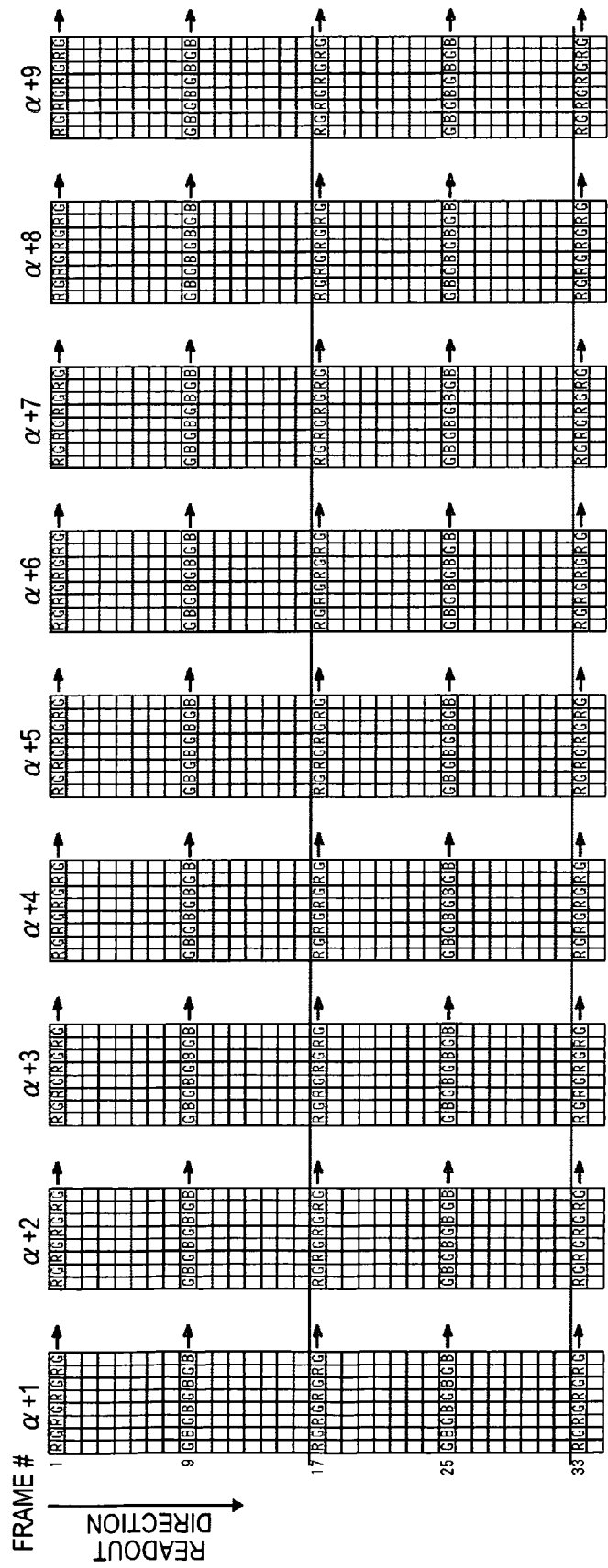
FIG. 16 is an illustration showing rows at which corrected pixel data are output.

A description will now be made on values output as pixel data at the output rows shown in FIG. 16.

When pixel data are output at a row that is different from the rows at which the data are read out, for example, the CMOS image sensor 11 calculates weighted sums of pixel data of the two readout rows closest to the outputting row in the vertical direction and outputs the calculation results. The weighted sums are values obtained by performing weighted addition of the pixel data according to the distance (the number of rows) between the outputting row and the readout rows.

When pixel data are read out and output at the same row, the CMOS image sensor 11 outputs the read pixel data as they are.

In a ⅛ sub-sampling mode such as (1,15) sub-sampling, there are eight patterns of rows at which pixel data are read out as described above with reference to FIG. 15. Therefore, weighted sums (including directly output sums) are calculated also in eight different ways. However, since the positions and reading order of rows to be read out are determined in advance along with outputting rows, expressions for calculating weighted sums can be also determined in advance. For example, in a ¼ sub-sampling mode such as (1,7) sub-sampling, there are four patterns of rows from which pixel data are readout, and weighted sums are therefore calculated in four different ways.

[Correction Process Performed on GB Rows Serving as Outputting Rows]

Figure 17:
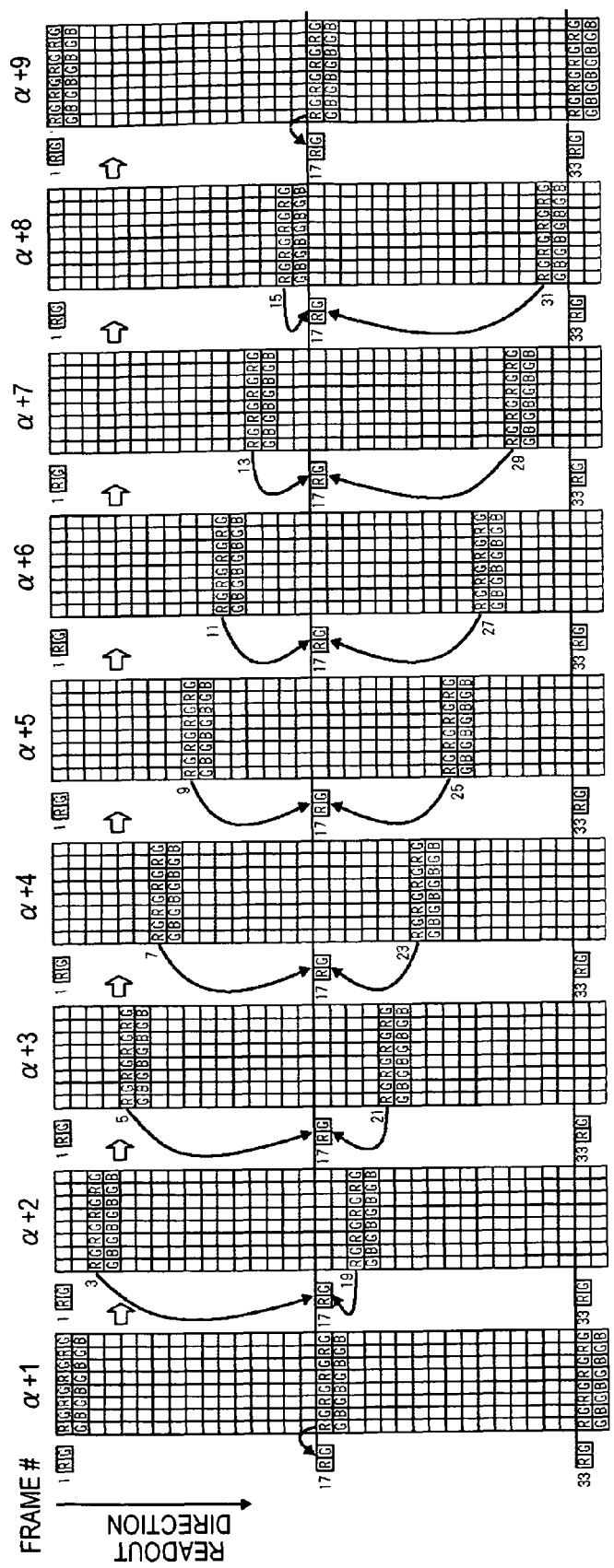
FIG. 17 is an illustration showing a correction process performed when the outputting rows are GB rows.

A description will now be made with reference to FIG. 17 on a correction process performed when GB rows serves as outputting rows.

The description will be made on an assumption that the 17th row serves as an outputting row.

In the (α+1)-th frame, since pixel data are output at the same rows where the data are read out, the CMOS image sensor 11 outputs pixel data read out from the 17th row as they are.

In the (α+2)-th frame, pixel data are output at rows different from the rows from which the data are read out. Therefore, the CMOS image sensor 11 calculates weighted sums of pixel data read out from the third row and the 19th row which are the two readout rows closest to the 17th row in the readout pattern, and the calculation results are output at the 17th row.

One of the readout rows, i.e., the third row is spaced by 14 rows from the 17th row that is an outputting row. The other readout row, i.e., the 19th row is spaced by two rows from the 17th row that is an outputting row. Therefore, corrected pixel data $P_{out}$ output at the 17th row is calculated using the following expression where $P_3$ represents pixel data read out from the third row and $P_{19}$ represents pixel data read out from the 19th row.

$$P_{OUT} = \left(\frac{2P_3 + 14P_{19}}{16}\right)$$

It can be said that the corrected pixel data $P_{OUT}$ is a value obtained by linearly interpolating the pixel data $P_3$ read out from the third row and the pixel data $P_{19}$ read out from the 19th row in the position of the outputting row.

In the $(\alpha+3)$-th frame, the CMOS image sensor 11 calculates weighted sums of pixel data read out from the fifth row and the 21st row and outputs the calculation results at the 17th row.

Corrected pixel data $P_{out}$ output by the CMOS image sensor 11 is obtained by the following expression where $P_5$ represents pixel data read out from the fifth row and $P_{21}$ represents pixel data read out from the 21st row.

$$P_{OUT} = \left(\frac{4P_5 + 12P_{21}}{16}\right)$$

In the $(\alpha+4)$-th frame, the CMOS image sensor 11 calculates weighted sums of pixel data read out from the seventh row and the 23rd row and outputs the calculation results at the 17th row.

In the $(\alpha+5)$-th frame, the CMOS image sensor 11 calculates weighted sums of pixel data read out from the ninth row and the 25th row and outputs the calculation results at the 17th row.

In the $(\alpha+6)$-th frame, the CMOS image sensor 11 calculates weighted sums of pixel data read out from the 11th row and the 27th row and outputs the calculation results at the 17th row.

In the $(\alpha+7)$-th frame, the CMOS image sensor 11 calculates weighted sums of pixel data read out from the 13th row and the 29th row and outputs the calculation results at the 17th row.

In the $(\alpha+8)$-th frame, the CMOS image sensor 11 calculates weighted sums of pixel data read out from the 15th row and the 31st row and outputs the calculation results at the 17th row.

In the $(\alpha+9)$-th frame, since pixel data outputting rows and readout rows coincide with each other again, the CMOS image sensor 11 outputs pixel data read out from the 17th row as they are.

[Correction Process Performed on GR Rows Serving as Outputting Rows]

A description will now be made with reference to FIG. 18 on a correction process performed when GR rows serves as outputting rows.

The description will be made on an assumption that the 25th row serves as an outputting row.

In the $(\alpha+1)$-th frame, pixel data are output at rows different from the rows from which the data are read out. Therefore, the CMOS image sensor 11 calculates weighted sums of pixel data read out from the 18th row and the 34th row which are the two readout rows closest to the 25th row in the readout pattern, and the calculation results are output at the 25th row.

In the $(\alpha+2)$-th frame, the CMOS image sensor 11 calculates weighted sums of pixel data read out from the 20th row and the 36th row (which are not shown) and outputs the calculation results at the 25th row.

In the $(\alpha+3)$-th frame, the CMOS image sensor 11 calculates weighted sums of pixel data read out from the 22nd row and the 38th row (which are not shown) and outputs the calculation results at the 25th row.

In the $(\alpha+4)$-th frame, the CMOS image sensor 11 calculates weighted sums of pixel data read out from the 24th row and the 40th row (which are not shown) and outputs the calculation results at the 25th row.

In the $(\alpha+5)$-th frame, the CMOS image sensor 11 calculates weighted sums of pixel data read out from the tenth row and the 26th row and outputs the calculation results at the 25th row.

In the $(\alpha+6)$-th frame, the CMOS image sensor 11 calculates weighted sums of pixel data read out from the 12th row and the 28th row and outputs the calculation results at the 25th row.

In the $(\alpha+7)$-th frame, the CMOS image sensor 11 calculates weighted sums of pixel data read out from the 13th row and the 30th row and outputs the calculation results at the 25th row.

In the $(\alpha+8)$-th frame, the CMOS image sensor 11 calculates weighted sums of pixel data read out from the 16th row and the 32nd row and outputs the calculation results at the 25th row.

In the $(\alpha+9)$-th frame, the CMOS image sensor 11 calculates weighted sums of pixel data read out from the 18th row and the 34th row again and outputs the calculation results at the 25th row.

As described above, the CMOS image sensor 11 performs a correction process as described above on images output by exercising the readout control according to the embodiment to output images. It is therefore possible to obtain an output image which has no inter-frame vertical offset of its center of gravity.

As a result, the DSP 201 (FIG. 14) provided downstream of the image sensor is not required to perform a process for correcting vertical offsets. Since the DSP can therefore be fully engaged in other image processes, the processing load on the DSP can be reduced. Referring to the CMOS image sensor 11 alone, it can provide the same exposure time as in the all-pixel readout mode even when imaging is performed at a high speed using sub-sampling reading. Further, the image sensor can output an image of high quality by correcting any offset in the vertical direction.

The above-described correction process for correcting offsets in the vertical direction may be performed by a signal processing circuit which may be provided, for example, downstream of the horizontal output line 17 in the CMOS image sensor 11 shown in FIG. 1. Obviously, the above-described CMOS image sensor 71 or 101 may perform the above-described correction process.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array section formed by a plurality of pixels including a photoelectric conversion element disposed in the form of a matrix; and control means for selectively controlling shutter operations and readout operations performed on the pixels of the pixel array section on a row-by-row basis to control an exposure time for the pixels, wherein the control means provides an exposure time lasting for Q frame periods to expose the pixels in each row of the pixel array section when sub-sampling reading is performed at a sub-sampling ratio of 1/Q (Q is a positive integer), and wherein, in a p-th frame following a (p−1)-th frame (P>1), the control means causes shutter operations and readout operations to be performed on rows of the pixel array section excluding rows on which shutter operations and readout operations have been performed in the (p−1)-th frame.

2. A solid-state imaging device according to claim 1, wherein the control means causes shutter operations and readout operations to be performed on all rows of the pixel array section in Q frame periods.

3. A solid-state imaging device according to claim 2, wherein
pixel data of the pixels read out by the readout operation are output at a predetermined outputting row, and
the device further comprising signal processing means for calculating and outputting weighted sums of the pixel data of the two readout rows closest to the outputting row in the vertical direction of the pixel array section.

4. A solid-state imaging device according to claim 2 which is a column A/D conversion type.

5. A driving control method for a solid-state imaging device having a pixel array section formed by a plurality of pixels including a photoelectric conversion element disposed in the form of a matrix and control means for selectively controlling shutter operations and readout operations performed on the pixels of the pixel array section on a row-by-row basis to control an exposure time for the pixels, the method comprising:

selectively controlling shutter operations and readout operations performed on the pixels in the pixel array section on a row-by-row basis such that an exposure time lasting for Q frame periods is provided to expose the pixels in each row of the pixel array section when sub-sampling reading is performed at a sub-sampling ratio of 1/Q; and causing, in a p-th frame following a (p−1)-th frame (P>1), shutter operations and readout operations to be performed on rows of the pixel array section excluding rows on which shutter operations and readout operations have been performed in the (p−1)-th frame.

6. A solid-state imaging device comprising:
a pixel array section formed by a plurality of pixels including a photoelectric conversion element disposed in the form of a matrix; and
a control section configured to selectively control shutter operations and readout operations performed on the pixels of the pixel array section on a row-by-row basis to control an exposure time for the pixels,
wherein the control section provides an exposure time lasting for Q frame periods to expose the pixels in each row of the pixel array section when sub-sampling reading is performed at a sub-sampling ratio of 1/Q (Q is a positive integer), and
wherein, in a p-th frame following a p−1)-th frame (P>1), the control section causes shutter operations and readout operations to be performed on rows of the pixel array section excluding rows on which shutter operations and readout operations have been performed in the p−1)-th frame.

* * * * *